United States Patent
Feng et al.

(10) Patent No.: US 11,115,600 B1
(45) Date of Patent: Sep. 7, 2021

(54) DYNAMIC FIELD OF VIEW COMPENSATION FOR AUTOFOCUS

(71) Applicant: QUALCOMM Incorporated, San Diego, CA (US)

(72) Inventors: Wen-Chun Feng, Taiwan (TW); Hui Shan Kao, New Taipei (TW); Jian-Jia Su, Taiwan (TW)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/900,829

(22) Filed: Jun. 12, 2020

(51) Int. Cl.
*H04N 5/232* (2006.01)

(52) U.S. Cl.
CPC ............ *H04N 5/23299* (2018.08); *H04N 5/232127* (2018.08)

(58) Field of Classification Search
CPC ......... H04N 5/23299; H04N 5/232127; H04N 5/23212; H04N 5/232121; H04N 5/232122; H04N 5/232123; H04N 5/232125; H04N 5/232133; H04N 5/23216; H04N 5/23218; H04N 5/232; H04N 5/23219
USPC ...................................................... 348/222.1
See application file for complete search history.

(56) References Cited

U.S. PATENT DOCUMENTS

| | | | |
|---|---|---|---|
| 7,688,364 B2* | 3/2010 | LeGall | H04N 5/232 348/240.99 |
| 2006/0125937 A1* | 6/2006 | LeGall | H04N 5/23296 348/240.99 |
| 2016/0142625 A1* | 5/2016 | Weksler | H04N 5/23222 348/222.1 |
| 2018/0070019 A1* | 3/2018 | Laurent | H04N 5/23206 |
| 2018/0220062 A1* | 8/2018 | Funatsu | G06F 3/0488 |
| 2018/0227487 A1* | 8/2018 | Heo | H04N 5/23254 |
| 2018/0284392 A1* | 10/2018 | Stafford | G06F 3/0304 |
| 2019/0037143 A1* | 1/2019 | Tsubusaki | H04N 5/23245 |
| 2019/0075237 A1* | 3/2019 | Cheung | G06K 9/00369 |
| 2019/0141251 A1* | 5/2019 | Ardo | H04N 5/23216 |
| 2019/0213710 A1* | 7/2019 | Roulet | H04N 5/3454 |
| 2019/0222754 A1* | 7/2019 | Shibagami | H04N 5/232127 |
| 2020/0110958 A1* | 4/2020 | Hwang | H04N 21/4223 |
| 2020/0137308 A1* | 4/2020 | Kulik | H04N 5/23287 |
| 2020/0320661 A1* | 10/2020 | Lin | H04N 5/2258 |
| 2020/0382725 A1* | 12/2020 | Gao | H04N 5/23296 |

* cited by examiner

*Primary Examiner* — Pritham D Prabhakher
(74) *Attorney, Agent, or Firm* — Qualcomm Incorporated

(57) ABSTRACT

An image processing device receives image data from an image frame captured by an image sensor of an image capture device. The image processing device moves a lens of the image capture device while still receiving the image data from the image frame, for instance as part of an autofocus operation. The image processing device determines multiple positions of the lens from the beginning of the movement to the end of the movement based on a lens position sensor, based on differences between the image frame and other consecutive image frames, or based on interpolation. The image processing device performs field of view compensation on the image data by cropping one or more rows of the image data based on the positions of the lens.

30 Claims, 13 Drawing Sheets

DYNAMIC FIELD OF VIEW COMPENSATION FOR AUTOFOCUS

FIELD

This application is related to image processing. More specifically, this application relates to systems and methods of performing field of view compensation during autofocus to prevent visual changes related to changes in field of view during autofocus.

BACKGROUND

Cameras are devices that capture images of a scene when light from the scene reaches an image sensor of the camera. Cameras generally include one or more lenses through which light travels before the light reaches the image sensor of the camera to capture the image. These lenses bend light from the scene to focus the light onto the image sensor. If the light is focused precisely on the image sensor, the scene appears sharp and in focus in an image of the scene captured by the image sensor. If the light is not focused precisely on the image sensor, the scene appears blurry and out of focus in an image of the scene captured by the image sensor. Adjusting the focus of a camera is generally achieved by moving a lens of the camera either closer to or farther from the image sensor.

The field of view (FOV) of a camera is a measurement indicating how much of a scene is observable by the image sensor of the camera. In some cases, certain arrangements of lenses of a camera can limit or expand the field of view of the camera. In some cases, the field of view of a camera can be affected while the focus of the camera is changing due to the lens movement used to focus the camera. However, simultaneous changes to focus and field of view can be confusing to users. Generally, users like to be able to control different properties of a camera independently of other properties of the camera.

SUMMARY

An image capture and processing device is described with a lens that begins moving while image data corresponding to an image frame is still being read from an image sensor. The image capture and processing device determines positions of the lens across the duration of the movement, and performs field of view (FOV) compensation by cropping certain rows of the image data based on the determined positions of the lens.

In one example, a method of guiding image capture is provided. The method includes receiving image data corresponding to an image frame captured by an image sensor of an image capture device. The method also includes moving a lens of the image capture device while still receiving the image data corresponding to the image frame. The method also includes determining a plurality of positions of the lens corresponding to movement of the lens. The method also includes performing field of view compensation on the image data from the image frame by cropping one or more rows of the image data based on the plurality of positions of the lens.

In another example, an apparatus for guiding image capture is provided. The apparatus includes an image sensor and a lens mechanism. The apparatus includes one or more memory units storing instructions and one or more processors that execute the instructions. Execution of the instructions by the one or more processors causes the one or more processors to perform operations. The operations include receiving image data corresponding to an image frame captured by the image sensor. The operations include moving the lens while still receiving the image data corresponding to the image frame using the image sensor connector. The operations also include determining a plurality of positions of the lens corresponding to movement of the lens. The operations also include performing field of view compensation on the image data from the image frame by cropping one or more rows of the image data based on the plurality of positions of the lens.

In another example, a non-transitory computer-readable medium is provided that has stored thereon instructions that, when executed by one or more processors, cause the one or more processors to: receive image data corresponding to an image frame captured by an image sensor of an image capture device; move a lens of the image capture device while still receiving the image data corresponding to the image frame; determine a plurality of positions of the lens corresponding to movement of the lens; and perform field of view compensation on the image data from the image frame by cropping one or more rows of the image data based on the plurality of positions of the lens.

In another example, an apparatus for compressing one or more images is provided. The apparatus includes: means for receiving image data corresponding to an image frame captured by an image sensor of an image capture device; means for moving a lens of the image capture device while still receiving the image data corresponding to the image frame; means for determining a plurality of positions of the lens corresponding to movement of the lens; and means for performing field of view compensation on the image data from the image frame by cropping one or more rows of the image data based on the plurality of positions of the lens.

In some aspects, moving the lens of the image capture device includes actuating a motor (or other lens mechanism) that moves the lens. In some aspects, the motor is a voice coil motor. In some aspects, moving the lens of the image capture device includes moving the lens of the image capture device from a start position corresponding to a first cropping ratio to an end position corresponding to a second cropping ratio, wherein the plurality of positions of the lens include the start position and the end position.

In some aspects, the plurality of positions of the lens include a first position, a second position, and a third position, wherein determining the second position includes interpolating the second position to be the first position and the third position. In some aspects, interpolating the second position based on the first position, a first timestamp corresponding to the first position, the third position, a third timestamp corresponding to the third position, and a second timestamp corresponding to the second position, wherein the second timestamp is between the first timestamp and the third timestamp. In some aspects, the methods, apparatuses, and computer-readable medium described above further comprise: interpolating a second cropping ratio corresponding to the second position to be between a first cropping ratio that corresponds to the first position and a third cropping ratio that corresponds to the third position, wherein cropping the one or more rows of the image data based on the plurality of positions of the lens includes cropping different subsets of the one or more rows using the first cropping ratio, the second cropping ratio, and the third cropping ratio, respectively.

In some aspects, performing field of view compensation on the image data from the image frame includes resizing each of the one or more rows of the image data in addition to cropping the one or more rows of the image data.

In some aspects, the methods, apparatuses, and computer-readable medium described above further comprise: receiving a lens position sensor signal from a lens position sensor, wherein determining the plurality of positions of the lens includes determining at least a first position of the lens of the plurality of positions of the lens based on the lens position sensor signal. In some aspects, the methods, apparatuses, and computer-readable medium described above further comprise: determining a first timestamp corresponding to the first position of the lens based on a time of receipt of the lens position sensor signal from the lens position sensor, wherein performing the field of view compensation on the image data is based on the first timestamp.

In some aspects, the methods, apparatuses, and computer-readable medium described above further comprise: receiving additional image data from one or more additional image frames captured by the image sensor after the image sensor captures the image frame, wherein determining the plurality of positions of the lens includes determining at least one of the plurality of positions of the lens based on an image difference between the image frame and the one or more additional image frames. In some aspects, the methods, apparatuses, and computer-readable medium described above further comprise: determining a duration of movement of the lens based on a number of rows of pixels for which the image difference indicates a change in field of view, a height of the image frame, an exposure time setting of the image capture device, wherein determining the plurality of positions of the lens is based on the duration of movement of the lens. In some aspects, the image sensor captures the one or more additional image frames consecutively after capturing the image frame.

In some aspects, moving the lens of the image capture device includes moving the lens toward the image sensor. In some aspects, moving the lens of the image capture device changes a focus setting from a first focus to a second focus. In some aspects, moving the lens of the image capture device is part of an autofocus process.

In some aspects, cropping the one or more rows of the image data based on the plurality of positions of the lens includes cropping a first row of the image data to a first size and cropping a second row of the image data to a second size that is distinct from the first size.

In some aspects, the apparatus comprises a camera, a mobile device (e.g., a mobile telephone or so-called "smart phone" or other mobile device), a wireless communication device, a wearable device, an extended reality device (e.g., a virtual reality (VR) device, an augmented reality (AR) device, or a mixed reality (MR) device), a personal computer, a laptop computer, a server computer, or other device. In some aspects, the apparatus includes a camera or multiple cameras for capturing one or more images. In some aspects, the apparatus further includes a display for displaying one or more images, notifications, and/or other displayable data.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present application are described in detail below with reference to the following figures.

DETAILED DESCRIPTION

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

An image processing device 105B is described that receives image data from an image frame captured by an image sensor 130 of an image capture device 105A. The image processing device 105B moves a lens 115 of the image capture device 105A while still receiving the image data corresponding to the image frame, for instance as part of an autofocus operation. The image processing device 105B determines multiple positions of the lens 115 from the beginning of the movement to the end of the movement based on a lens position sensor, based on differences between the image frame and other consecutive image frames, or based on interpolation. The image processing device 105B performs field of view compensation on the image data by cropping one or more rows of the image data based on the positions of the lens 115.

Figure 1:
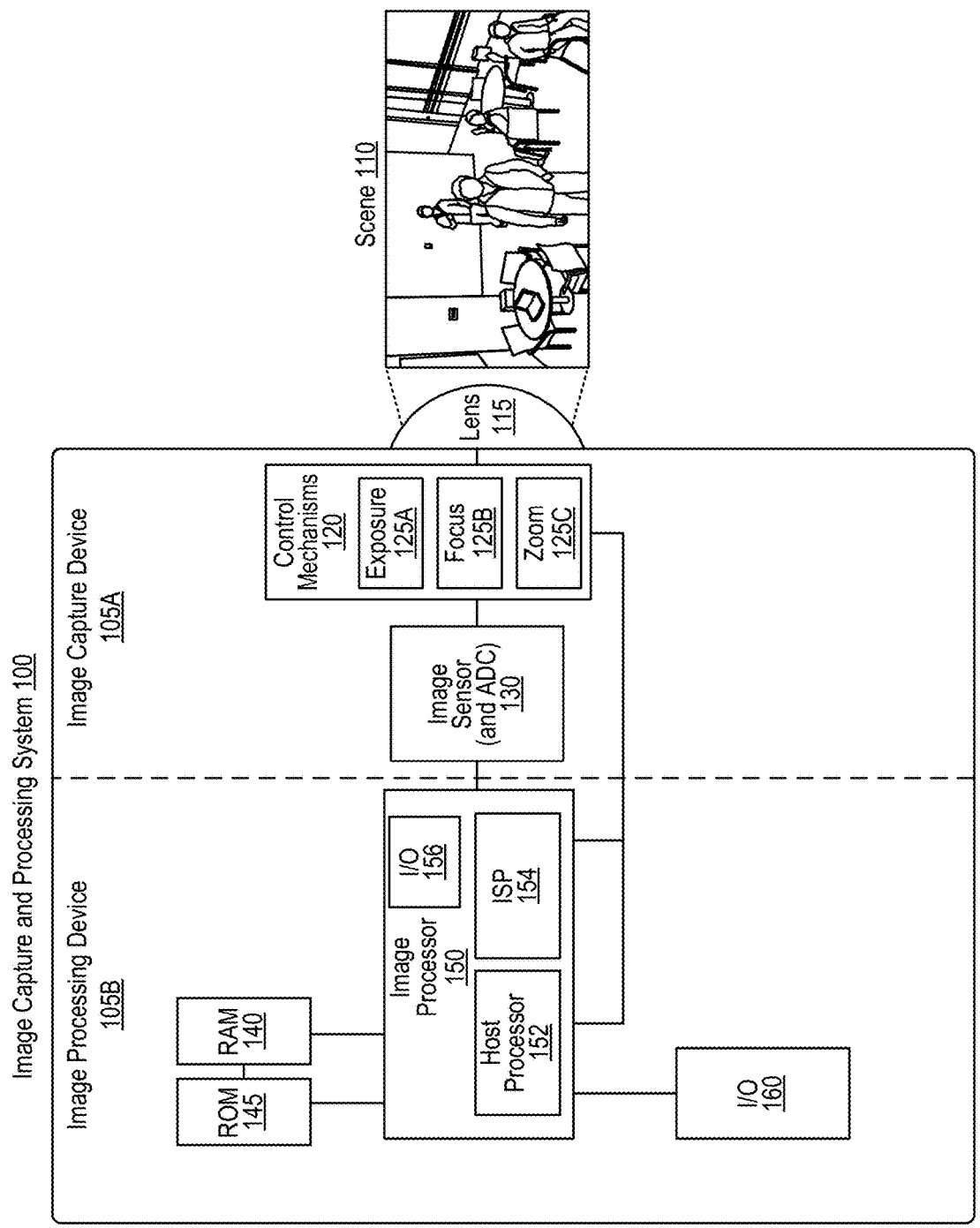
FIG. 1 is a block diagram illustrating an architecture of an image capture and processing device.

FIG. 1 is a block diagram illustrating an architecture of an image capture and processing system 100. The image capture and processing system 100 includes various components that are used to capture and process images of scenes (e.g., an image of a scene 110). The image capture and processing system 100 can capture standalone images (or photographs) and/or can capture videos that include multiple images (or video frames) in a particular sequence. A lens 115 of the system 100 faces a scene 110 and receives light from the scene 110. The lens 115 bends the light toward the image sensor 130. The light received by the lens 115 passes through an aperture controlled by one or more control mechanisms 120 and is received by an image sensor 130.

The one or more control mechanisms 120 may control exposure, focus, and/or zoom based on information from the image sensor 130 and/or based on information from the image processor 150. The one or more control mechanisms 120 may include multiple mechanisms and components; for instance, the control mechanisms 120 may include one or more exposure control mechanisms 125A, one or more focus control mechanisms 125B, and/or one or more zoom control mechanisms 125C. The one or more control mechanisms 120 may also include additional control mechanisms besides those that are illustrated, such as control mechanisms controlling analog gain, flash, HDR, depth of field, and/or other image capture properties.

The focus control mechanism 125B of the control mechanisms 120 can obtain a focus setting. In some examples, focus control mechanism 125B store the focus setting in a memory register. Based on the focus setting, the focus control mechanism 125B can adjust the position of the lens 115 relative to the position of the image sensor 130. For example, based on the focus setting, the focus control mechanism 125B can move the lens 115 closer to the image sensor 130 or farther from the image sensor 130 by actuating a motor or servo (or other lens mechanism), thereby adjusting focus. In some cases, additional lenses may be included in the system 100, such as one or more microlenses over each photodiode of the image sensor 130, which each bend the light received from the lens 115 toward the corresponding photodiode before the light reaches the photodiode. The focus setting may be determined via contrast detection autofocus (CDAF), phase detection autofocus (PDAF), or some combination thereof. The focus setting may be determined using the control mechanism 120, the image sensor 130, and/or the image processor 150. The focus setting may be referred to as an image capture setting and/or an image processing setting.

The exposure control mechanism 125A of the control mechanisms 120 can obtain an exposure setting. In some cases, the exposure control mechanism 125A stores the exposure setting in a memory register. Based on this exposure setting, the exposure control mechanism 125A can control a size of the aperture (e.g., aperture size or f/stop), a duration of time for which the aperture is open (e.g., exposure time or shutter speed), a sensitivity of the image sensor 130 (e.g., ISO speed or film speed), analog gain applied by the image sensor 130, or any combination thereof. The exposure setting may be referred to as an image capture setting and/or an image processing setting.

The zoom control mechanism 125C of the control mechanisms 120 can obtain a zoom setting. In some examples, the zoom control mechanism 125C stores the zoom setting in a memory register. Based on the zoom setting, the zoom control mechanism 125C can control a focal length of an assembly of lens elements (lens assembly) that includes the lens 115 and one or more additional lenses. For example, the zoom control mechanism 125C can control the focal length of the lens assembly by actuating one or more motors or servos (or other lens mechanism) to move one or more of the lenses relative to one another. The zoom setting may be referred to as an image capture setting and/or an image processing setting. In some examples, the lens assembly may include a parfocal zoom lens or a varifocal zoom lens. In some examples, the lens assembly may include a focusing lens (which can be lens 115 in some cases) that receives the light from the scene 110 first, with the light then passing through an afocal zoom system between the focusing lens (e.g., lens 115) and the image sensor 130 before the light reaches the image sensor 130. The afocal zoom system may, in some cases, include two positive (e.g., converging, convex) lenses of equal or similar focal length (e.g., within a threshold difference) with a negative (e.g., diverging, concave) lens between them. In some cases, the zoom control mechanism 125C moves one or more of the lenses in the afocal zoom system, such as the negative lens and one or both of the positive lenses.

The image sensor 130 includes one or more arrays of photodiodes or other photosensitive elements. Each photodiode measures an amount of light that eventually corresponds to a particular pixel in the image produced by the image sensor 130. In some cases, different photodiodes may be covered by different color filters, and may thus measure light matching the color of the filter covering the photodiode. For instance, Bayer color filters include red color filters, blue color filters, and green color filters, with each pixel of the image generated based on red light data from at least one photodiode covered in a red color filter, blue light data from at least one photodiode covered in a blue color filter, and green light data from at least one photodiode covered in a green color filter. Other types of color filters may use yellow, magenta, and/or cyan (also referred to as "emerald") color filters instead of or in addition to red, blue, and/or green color filters. Some image sensors may lack color filters altogether, and may instead use different photodiodes throughout the pixel array (in some cases vertically stacked). The different photodiodes throughout the pixel array can have different spectral sensitivity curves, therefore responding to different wavelengths of light. Monochrome image sensors may also lack color filters and therefore lack color depth.

In some cases, the image sensor 130 may alternately or additionally include opaque and/or reflective masks that block light from reaching certain photodiodes, or portions of certain photodiodes, at certain times and/or from certain angles, which may be used for phase detection autofocus (PDAF). The image sensor 130 may also include an analog gain amplifier to amplify the analog signals output by the photodiodes and/or an analog to digital converter (ADC) to convert the analog signals output of the photodiodes (and/or amplified by the analog gain amplifier) into digital signals. In some cases, certain components or functions discussed with respect to one or more of the control mechanisms 120 may be included instead or additionally in the image sensor 130. The image sensor 130 may be a charge-coupled device (CCD) sensor, an electron-multiplying CCD (EMCCD) sensor, an active-pixel sensor (APS), a complimentary metal-oxide semiconductor (CMOS), an N-type metal-oxide semiconductor (NMOS), a hybrid CCD/CMOS sensor (e.g., sCMOS), or some other combination thereof.

The image processor 150 may include one or more processors, such as one or more image signal processors (ISPs) (including ISP 154), one or more host processors (including host processor 152), and/or one or more of any other type of processor 1010 discussed with respect to the computing device 1000. The host processor 152 can be a digital signal processor (DSP) and/or other type of processor. In some implementations, the image processor 150 is a single integrated circuit or chip (e.g., referred to as a system-on-chip or SoC) that includes the host processor 152 and the ISP 154. In some cases, the chip can also include one or more input/output ports (e.g., input/output (I/O) ports 156), central processing units (CPUs), graphics processing units (GPUs), broadband modems (e.g., 3G, 4G or LTE, 5G, etc.), memory, connectivity components (e.g., Bluetooth™, Global Positioning System (GPS), etc.), any combination thereof, and/or other components. The I/O ports 156 can include any suitable input/output ports or interface according to one or more protocol or specification, such as an Inter-Integrated Circuit 2 (I2C) interface, an Inter-Integrated Circuit 3 (I3C) interface, a Serial Peripheral Interface (SPI) interface, a serial General Purpose Input/Output (GPIO) interface, a Mobile Industry Processor Interface (MIPI) (such as a MIPI CSI-2 physical (PHY) layer port or interface, an Advanced High-performance Bus (AHB) bus, any combination thereof, and/or other input/output port. In one illustrative example, the host processor 152 can communicate with the image sensor 130 using an I2C port, and the ISP 154 can communicate with the image sensor 130 using an MIPI port.

The image processor 150 may perform a number of tasks, such as de-mosaicing, color space conversion, image frame downsampling, pixel interpolation, automatic exposure (AE) control, automatic gain control (AGC), CDAF, PDAF, automatic white balance, merging of image frames to form an HDR image, image recognition, object recognition, feature recognition, receipt of inputs, managing outputs, managing memory, or some combination thereof. The image processor 150 may store image frames and/or processed images in random access memory (RAM) 140/1020, read-only memory (ROM) 145/1025, a cache, a memory unit, another storage device, or some combination thereof.

Various input/output (I/O) devices 160 may be connected to the image processor 150. The I/O devices 160 can include a display screen, a keyboard, a keypad, a touchscreen, a trackpad, a touch-sensitive surface, a printer, any other output devices 1035, any other input devices 1045, or some combination thereof. In some cases, a caption may be input into the image processing device 105B through a physical keyboard or keypad of the I/O devices 160, or through a virtual keyboard or keypad of a touchscreen of the I/O devices 160. The I/O 160 may include one or more ports, jacks, or other connectors that enable a wired connection between the device 100 and one or more peripheral devices, over which the device 100 may receive data from the one or more peripheral device and/or transmit data to the one or more peripheral devices. The I/O 160 may include one or more wireless transceivers that enable a wireless connection between the device 100 and one or more peripheral devices, over which the device 100 may receive data from the one or more peripheral device and/or transmit data to the one or more peripheral devices. The peripheral devices may include any of the previously-discussed types of I/O devices 160 and may themselves be considered I/O devices 160 once they are coupled to the ports, jacks, wireless transceivers, or other wired and/or wireless connectors.

In some cases, the image capture and processing system 100 may be a single device. In some cases, the image capture and processing system 100 may be two or more separate devices, including an image capture device 105A (e.g., a camera) and an image processing device 105B (e.g., a computing device coupled to the camera). In some implementations, the image capture device 105A and the image processing device 105B may be coupled together, for example via one or more wires, cables, or other electrical connectors, and/or wirelessly via one or more wireless transceivers. In some implementations, the image capture device 105A and the image processing device 105B may be disconnected from one another.

As shown in FIG. 1, a vertical dashed line divides the image capture and processing system 100 of FIG. 1 into two portions that represent the image capture device 105A and the image processing device 105B, respectively. The image capture device 105A includes the lens 115, control mechanisms 120, and the image sensor 130. The image processing device 105B includes the image processor 150 (including the ISP 154 and the host processor 152), the RAM 140, the ROM 145, and the I/O 160. In some cases, certain components illustrated in the image capture device 105A, such as the ISP 154 and/or the host processor 152, may be included in the image capture device 105A.

The image capture and processing system 100 can include an electronic device, such as a mobile or stationary telephone handset (e.g., smartphone, cellular telephone, or the like), a desktop computer, a laptop or notebook computer, a tablet computer, a set-top box, a television, a camera, a display device, a digital media player, a video gaming console, a video streaming device, an Internet Protocol (IP) camera, or any other suitable electronic device. In some examples, the image capture and processing system 100 can include one or more wireless transceivers for wireless communications, such as cellular network communications, 802.11 wi-fi communications, wireless local area network (WLAN) communications, or some combination thereof. In some implementations, the image capture device 105A and the image processing device 105B can be different devices. For instance, the image capture device 105A can include a camera device and the image processing device 105B can include a computing device, such as a mobile handset, a desktop computer, or other computing device.

While the image capture and processing system 100 is shown to include certain components, one of ordinary skill will appreciate that the image capture and processing system 100 can include more components than those shown in FIG. 1. The components of the image capture and processing system 100 can include software, hardware, or one or more combinations of software and hardware. For example, in some implementations, the components of the image capture and processing system 100 can include and/or can be implemented using electronic circuits or other electronic hardware, which can include one or more programmable electronic circuits (e.g., microprocessors, GPUs, DSPs, CPUs, and/or other suitable electronic circuits), and/or can include and/or be implemented using computer software, firmware, or any combination thereof, to perform the various operations described herein. The software and/or firmware can include one or more instructions stored on a computer-readable storage medium and executable by one or more processors of the electronic device implementing the image capture and processing system 100.

Figure 2A:
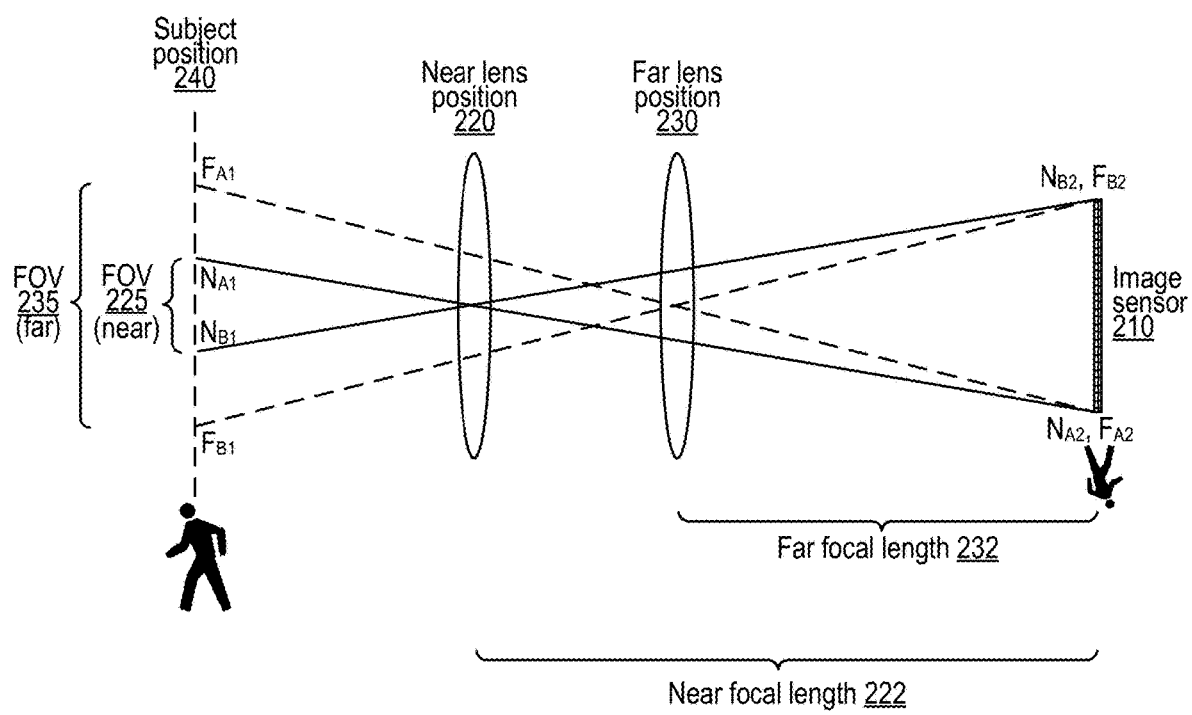
FIG. 2A is a conceptual diagram illustrating different positions of a lens of an image capture device causing different fields of view for the image capture device.

FIG. 2A is a conceptual diagram illustrating different positions of a lens of an image capture device 105A causing different fields of view for the image capture device. The conceptual diagram of FIG. 2A illustrates an image sensor 210 and a subject position 240 of the subject being photographed by the image capture device. A person is illustrated next to a vertical line representing the subject position, indicating that the person is the subject at the subject position 240. The subject person is illustrated upside-down next to the image sensor 210, indicating the light from the subject that reaches the image sensor 210. Two different lens positions 220 and 230 are illustrated between image sensor 210 and a subject position 240. The near lens position 220 refers to a lens position 220 that generally provides better focus for scenes that are near the image capture device 105A (e.g., less than a threshold distance from the image capture device 105A). The far lens position 230 refers to a lens position 230 that generally provides better focus for scenes that are far from the image capture device 105A (e.g., more than a threshold distance from the image capture device 105A). The near lens position 220 is a near focal length 222 away from the image sensor 210, while the far lens position 230 is a far focal length 232 away from the image sensor. The near lens position 220 is closer to the image sensor 210 than the far lens position 230, and farther from the subject position 240. The far lens position 230 is farther from the image sensor 210 than the near lens position 220, and closer to the subject position 240. The near focal length 222 is greater than the far focal length 232.

Two lenses are illustrated in the conceptual diagram of FIG. 2A—one lens at the near lens position 220 and one lens at the far lens position 230. The lenses are illustrated as convex lenses, but in some cases may be concave lenses. These two lenses may represent two different positions of a single lens, but are illustrated as two separate lenses to illustrate how a field of view of the image capture device 105A when the lens moves between the near lens position 220 and the far lens position 230 in either direction (e.g., from the near lens position 220 to the far lens position 230 or from the far lens position 230 to the near lens position 220). In some cases, the two lenses may be separate lenses. For instance, one of the lenses may be removed and replaced with the other one of the lenses.

Two rays of light passing through the lens at the near lens position 220 are illustrated using solid black lines. One of these rays of light travels from point $N_{A1}$ to point N. The other one of these rays of light travels from point $N_{B1}$ to point $N_{B2}$. Light passing through the center of the lens is bent only to a small degree, while light passing through portions of the lens further from the center and closer to the edges is bent to a larger degree. Thus, the paths of the two rays of light pass through the center of the lens at the near lens position 220 and proceed onward until they reach the edges of the image sensor 210. The light origin points $N_{A1}$ and $N_{B1}$ are the light origin points that are farthest away from one another whose light still reaches the image sensor 210 through the center of the lens at the near lens position 220. Because the near lens position 220 is relatively close to the subject position 240, however, the light origin points $N_{A1}$ and $N_{B1}$ for the near lens position 220 are relatively close to one another. The distance between light origin points $N_{A1}$ and $N_{B1}$ represents the field of view (FOV) 225 of the image capture device 105A when the lens is at the near lens position 220.

Two rays of light passing through the lens at the far lens position 230 are illustrated using dashed black lines. One of these rays of light travels from point $F_{A1}$ to point $F_{A2}$ (which is also point $N_{A2}$). The other one of these rays of light travels from point $F_{B1}$ to point $F_{B2}$ (which is also point $N_{B2}$). The paths of the two rays of light pass through the center of the lens at the far lens position 230 and proceed onward until they reach the edges of the image sensor 210. The light origin points $F_{A1}$ and $F_{B1}$ are the light origin points that are farthest away from one another whose light still reaches the image sensor 210 through the center of the lens at the far lens position 230. Because the far lens position 230 is farther from the subject position 240 than the near lens position 220, the light origin points $F_{A1}$ and $F_{B1}$ for the far lens position 230 are farther apart from one another than the light origin points $N_{A1}$ and $N_{B1}$ for the near lens position 220. The distance between light origin points $F_{A1}$ and $F_{B1}$ represents the field of view (FOV) 235 of the image capture device 105A when the lens is at the far lens position 230. Thus, the field of view (FOV) 235 of the image capture device 105A when the lens is at the far lens position 230 is larger than the field of view (FOV) 225 of the image capture device 105A when the lens is at the near lens position 220. Thus, there is an inverse relationship between focal length (the distance between the lens and the image sensor 210) and the size of the field of view.

Figure 2B:
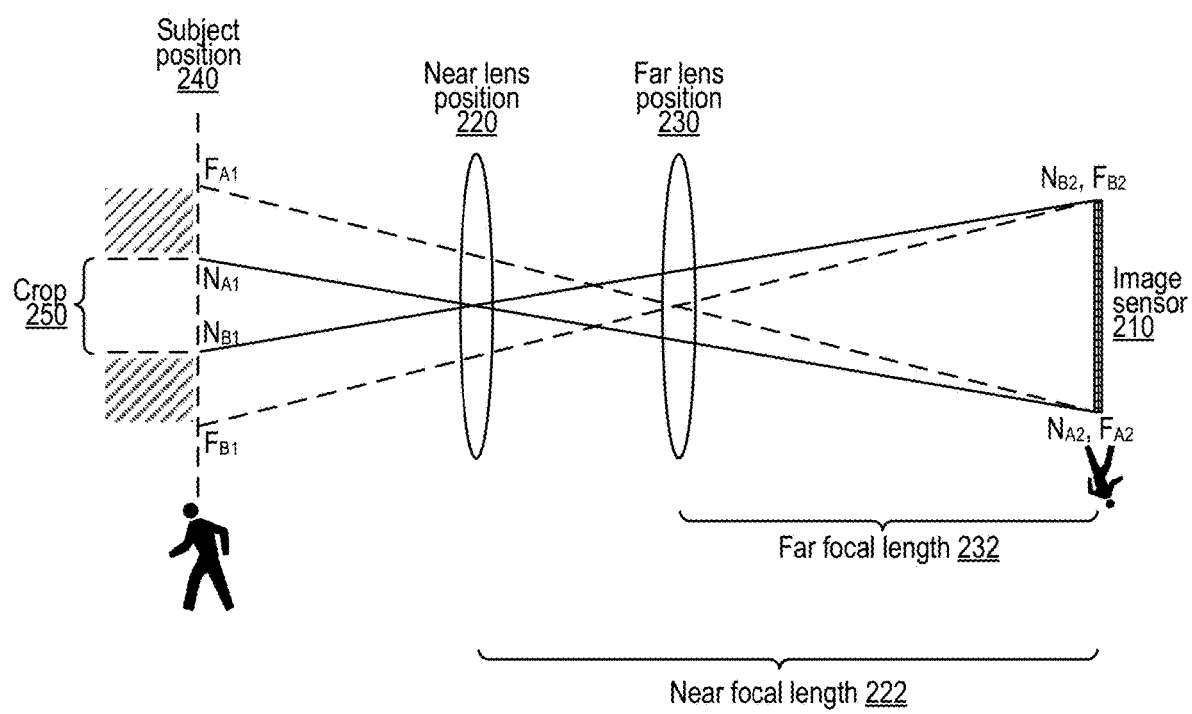
FIG. 2B is a conceptual diagram illustrating field of view compensation operation that crops an image with a large field of view into an image with a smaller field of view.

FIG. 2B is a conceptual diagram illustrating field of view compensation operation that crops an image with a large field of view into an image with a smaller field of view. Because the FOV 235 when the lens is at the far lens position 230 is larger than the FOV 225 when the lens is at the near lens position 220, an image captured by the image sensor 210 with the lens at the far lens position 230 should be cropped to give the image the same FOV 235 as if the image was captured with the lens was at the near lens position 220.

In the conceptual diagram of FIG. 2B, two dashed horizontal lines extend leftward from light origin points $F_{A1}$ and $F_{B1}$. The white space between these dashed horizontal lines extending left from light origin points $F_{A1}$ and $F_{B1}$ represents a crop area 250, where light from within the crop area is kept in the image after the cropping is performed. The space outside of the crop area 250 (outside of the dashed horizontal lines) is shaded with diagonal lines to indicate that light from these shaded areas is removed from the image by the cropping procedure.

The cropping of FIG. 2B allows the image capture device 105A to maintain a consistent FOV 225 while moving the lens from the near lens position 220 to the far lens position 230. In situations where the lens is moved to focus the image capture device 105A, this cropping operation enhances the experience of a user of the image capture device 105A by maintaining a consistent field of view despite the lens movement. This effectively allows for the focus property of the image capture device 105A to be modified without simultaneously modifying the field of view parameter of the image capture device 105A.

Figure 5A:
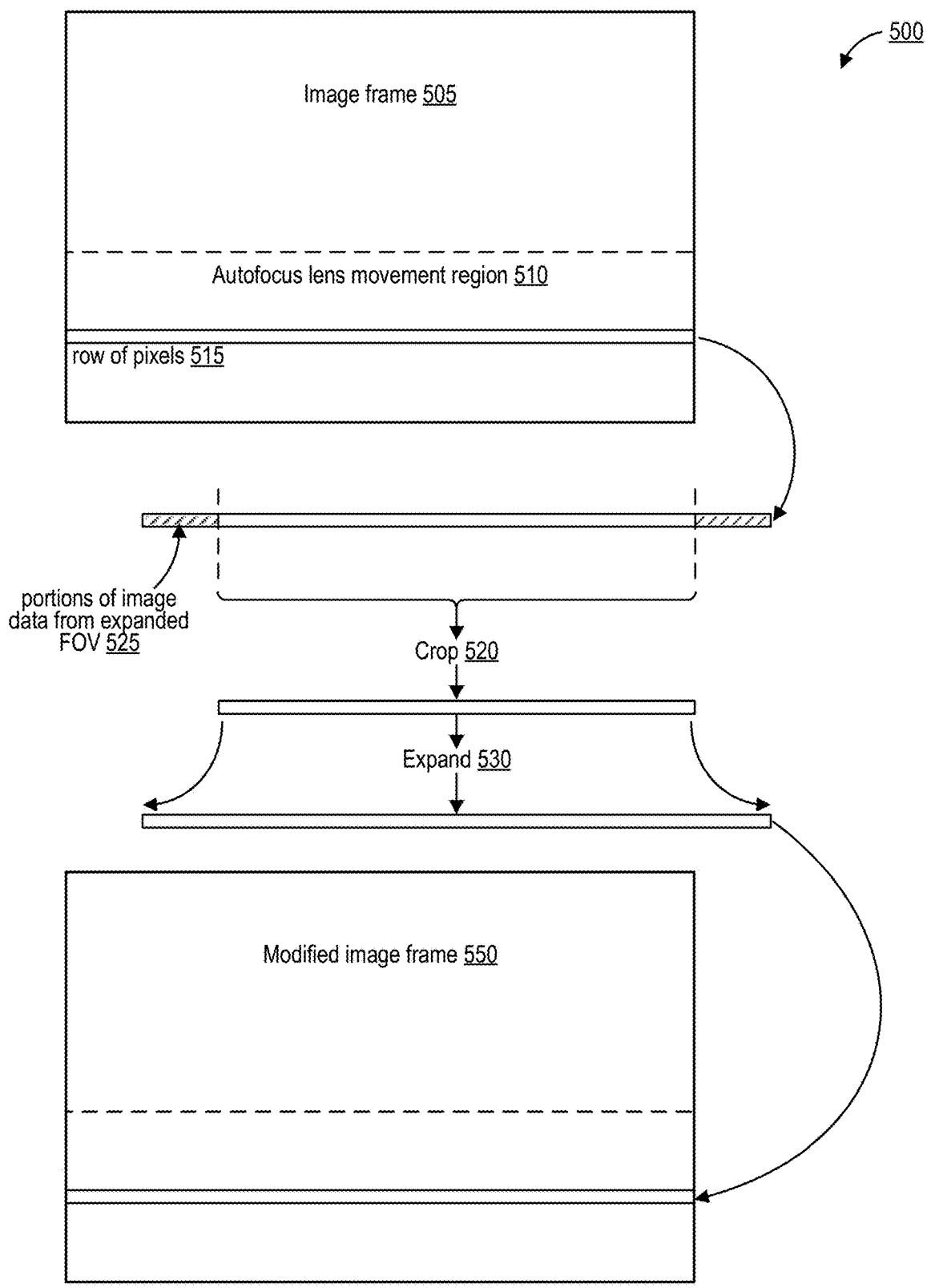
FIG. 5A is a conceptual diagram illustrating operations for horizontal field of view compensation for a particular row of pixels in an image frame.
Figure 5B:
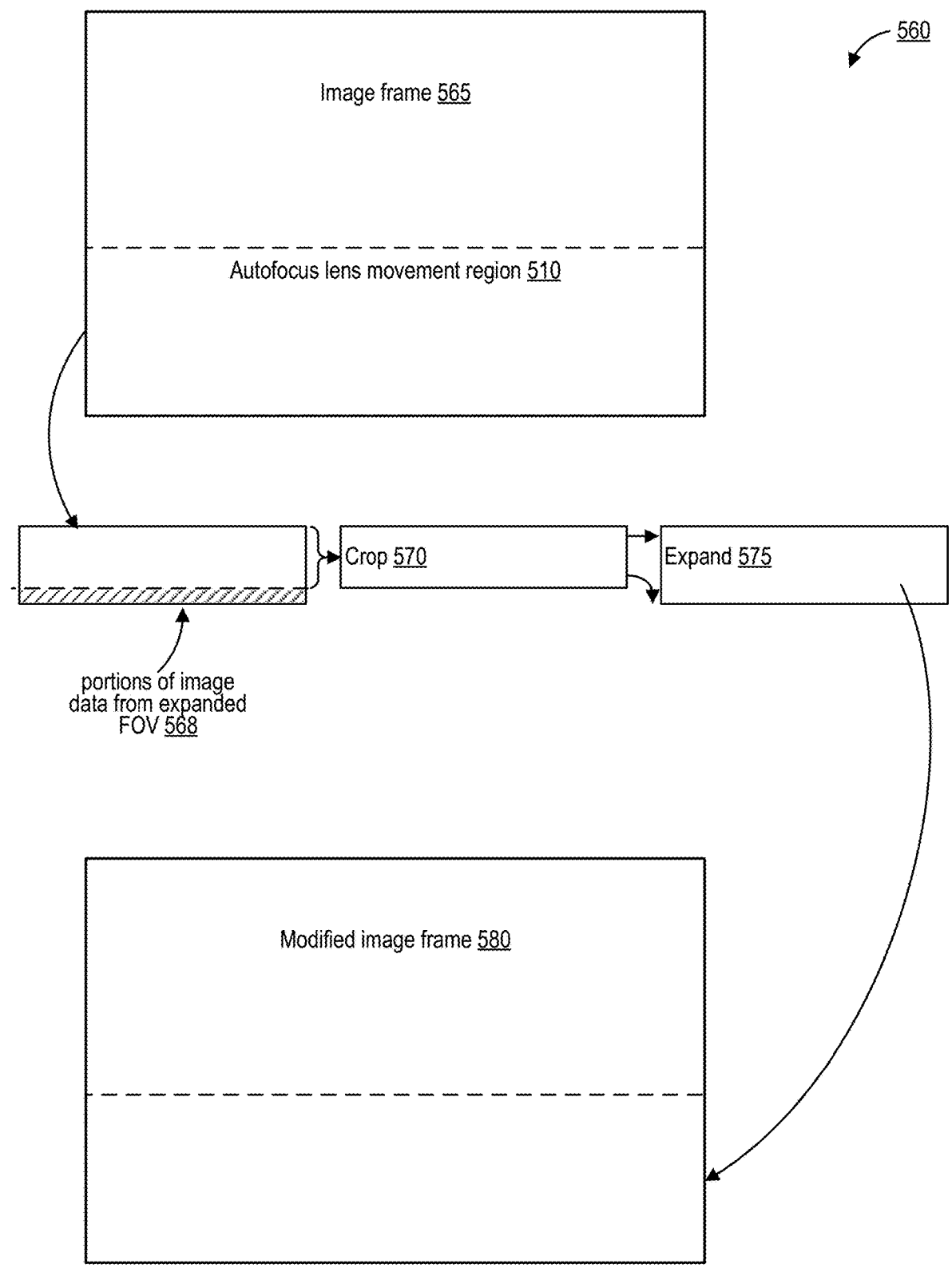
FIG. 5B is a conceptual diagram illustrating operations for vertical field of view compensation for an autofocus lens movement region in an image frame.

However, if the lens begins moving while an image frame is still being captured and read from the image sensor 210, the field of view might change only for the portion of the image frame captured and read from the image sensor while the lens was moving. Similarly, if a lens is still moving when an image frame starts to be captured and read from the image sensor 210, and the lens stops moving partway through capture and reading of the image frame from the image sensor 210, the change in field of view may be gradual for the portion of the image frame captured and read from the image sensor while the lens was moving, and may plateau for the portion of the image frame captured and read from the image sensor while the lens was stationary. In such cases, cropping the entire image frame uniformly might crop some parts of the image frame too much and/or might not crop some parts of the image frame enough. A more dynamic cropping method, such as one that uses operations such as those illustrated in FIGS. 5A and 5B, provides a solution for such changes to field of view that affect different portions of an image frame differently.

Figure 3:
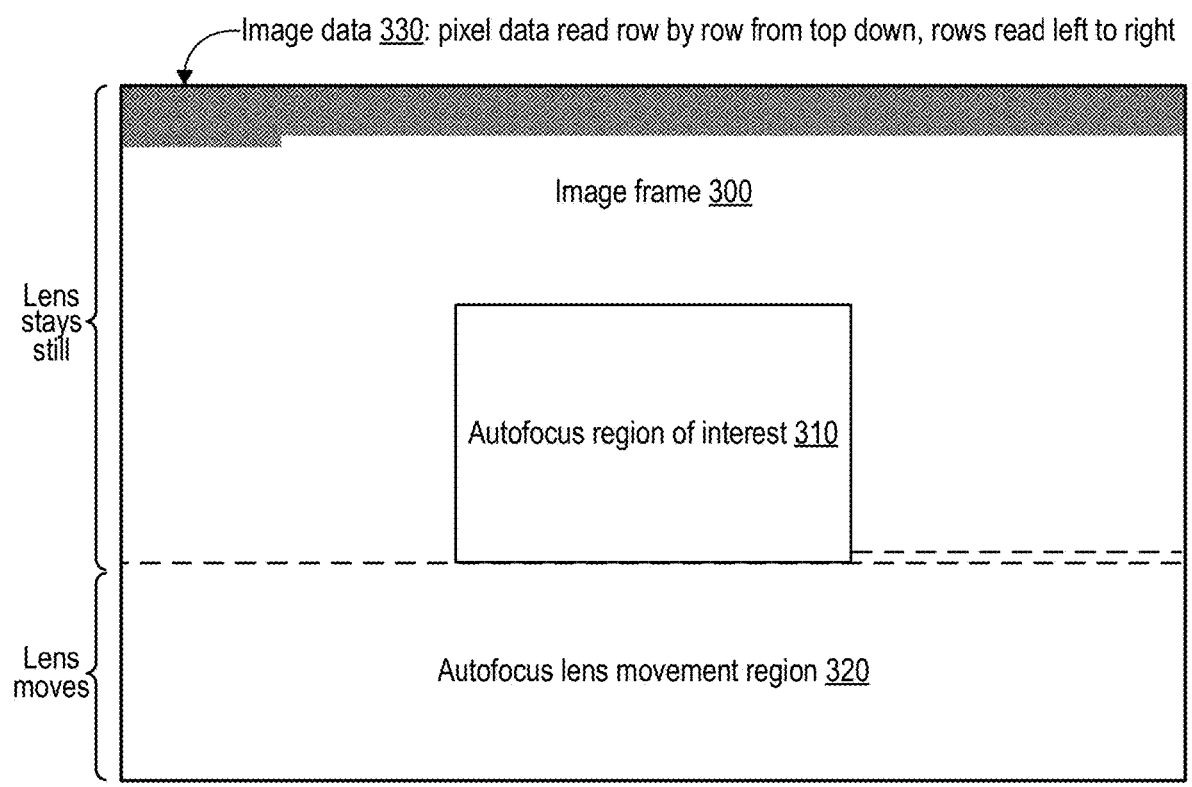
FIG. 3 is a conceptual diagram illustrating reading of an image frame from an image sensor, the conceptual diagram highlighting that highlights regions of the image frame that are relevant to autofocus.

FIG. 3 is a conceptual diagram illustrating reading of an image frame 300 from an image sensor 130, the conceptual diagram highlighting regions of the image frame that are relevant to autofocus. The image frame 300 is mostly white and includes a grey shaded region of image data 330 at the top. The shaded image data 330 includes several consecutive full rows of pixel data from the top of the image frame 300 going down, and one partial row of pixel data directly below the consecutive full rows of pixel data. The shaded image data 330 represents image data 330 from the image frame 300 that has been read from the image sensor 130 until a particular time. The shaded image data 330 is shaded to illustrate that image data is read from the image sensor 130 row by row from top to bottom, and further to illustrate that each row is read from left to right.

Some image capture devices 105A include automatic focusing functionality ("autofocus") that allows the image capture device 105A to focus automatically prior to capturing a desired image. Various autofocus technologies may be used. Active autofocus ("active AF") relies on determining a range between the camera and a subject of the image via a range sensor of the camera, typically by emitting infrared lasers or ultrasound signals and receiving reflections of those signals. While active AF works well in many cases and can be fairly quick, cameras with active AF can be bulky and expensive. Active AF can also fail to properly focus on subjects that are very close to the camera lens (macro photography), as the range sensor is not perfectly aligned with the camera lens, and this difference is exacerbated the closer the subject is to the camera lens. Active AF can also fail to properly focus on faraway subjects, as the infrared or ultrasound signals from the range sensor can weaken and scatter over large distances. Active AF also fails to properly focus on subjects on the other side of a window than the image capture device 105A, as the range sensor typically determines the range to the window rather than to the subject.

Passive autofocus ("passive AF") uses the image sensor 130 of the image capture devices 105A to focus the camera, and does not require range sensors or any other additional sensors to be integrated into the image capture devices 105A. Passive AF techniques include Contrast Detection Auto Focus (CDAF), Phase Detection Auto Focus (PDAF), and in some cases hybrid autofocus (HAF) systems that use a combination of PDAF and CDAF. In CDAF, the lens of image capture device 105A moves through a range of lens positions, typically with pre-specified distance intervals between each tested lens position. In between and/or during these lens movements, the image capture device 105A captures image frames that the image processing device 105B analyzes to determine a contrast between the subject's pixels and background pixels. Eventually, the image processing device 105B identifies one of these image frames at which the contrast between the subject's pixels and background pixels is maximized. The lens position at which this contrast is maximized is determined to be the lens position at which the image capture device 105A is best focused on the subject. CDAF relies on trial and error, and requires a motor that moves the lens to be actuated and stopped repeatedly in a short span of time while the image capture device 105A focuses.

In PDAF, the photodiode array of the image sensor 130 of the image capture device 105A is specially designed so that at least a subset of the photodiodes of the photodiode array are configured (e.g., via opaque pixel aperture masks) to receive light only from certain angles. These photodiodes are sometimes referred to as phase detection (PD) photodiodes. The data from the PD photodiodes is analyzed by the image processing device 105B to identify whether light that is received by the image sensor 130 from different angles converges to create a focused image that is "in phase" or fails to converge and thus creates a blurry images that is "out of phase." If light received from different angles is out of phase, the image processing device 105B identifies a direction in which the light is out of phase to determine whether the lens needs to be moved forward or backward, and identifies a phase disparity indicating how out of phase the light is to determine how far the lens must be moved. The image processing device 105B then sends a motor actuation signal to the motor over a motor connector to move the lens to the lens position corresponding to optimal focus. PDAF thus generally uses fewer, larger lens movements than CDAF. In some cases, a hybrid autofocus (HAF) system is used that uses both PDAF and CDAF. Specifically, the lens movement directed by PDAF can still sometime produce imperfect focus, and CDAF can be used within a short range of lens positions following PDAF in order to further optimize focus and compensate for any errors or inaccuracies in the PDAF.

As described above, CDAF and PDAF both rely on reading data from certain regions of the image sensor 130 to determine whether focus has been achieved. The autofocus region of interest (ROI) 310 illustrated in FIG. 3 represents a region of the image frame 300 that is used for CDAF or PDAF. For instance, in CDAF, the subject's pixels and background pixels may meet within the ROI 310. Thus, the image processing device 105B can determine the contrast between the subject's pixels and background pixels for CDAF after having read the pixel data from the pixels in the ROI 310, and does not necessarily need any image data from any rows of the image frame 300 below the ROI 310. Similarly, in PDAF, the ROI 310 may represent a region of the image frame 300 that is read from a region of the image sensor 130 that includes PD photodiodes. Thus, the image processing device 105B can determine whether the image frame 300 is in phase or out of phase, and the direction and degree to which the image frame 300 is out of phase, after having read the pixel data from the pixels in the ROI 310. The image processing device 105B may, in some cases, not need any image data from any rows of the image frame 300 below the ROI 310 for its focus determination for the image frame 300.

Because the image processing device 105B has received all of the information it needs to analyze whether the image capture device 105A is focused or not once the ROI 310 is read, the image processing device 105B can direct the lens to move immediately after reading the ROI 310. Thus, the image processing device 105B can direct the lens to move while a remainder of the image frame 300 beyond the ROI 310 is still being read from the image sensor 130. Because the image data 330 is read from the image sensor 130 row by row from the top down, the autofocus lens movement region 320 illustrated below the horizontal dashed line under the ROI 310 is a region of the image frame 300 that is read from the image sensor 130 while the lens is moving. As illustrated using a second horizontal dashed line in FIG. 3, the autofocus lens movement region 320 may in some cases also include a small area to the right of the bottom row of pixels of the ROI 310, because rows are read from the image sensor 130 from left to right.

Though the ROI 310 is illustrated as a rectangular region in the center of the image frame 300, this is exemplary rather than limiting. In other cases, the ROI 310 may be closer to the top, bottom, and/or either side of the image frame 300. The ROI 310 need not be rectangular, but may instead be circular, oval, triangular, pentagonal, hexagonal, or another polyhedral shape. The shape of the ROI 310 may be based on a shape of the subject, especially for CDAF where contrast between the subject's pixels and background pixels is used by the image processing device 105B to determine focus.

In the example of FIG. 3, image data 330 is read from the image sensor 130 row by row, from the top down, and with data from each row read left to right. In some cases, alternate reading patterns may be used. For instance, in some cases, image data may instead be read row by row, from the bottom up, in which case the autofocus lens movement region 320 would instead be above the ROI 310. In some cases, image data for each row may be read from right to left, in which case the autofocus lens movement region 320 may include a small area to the left of the last-read row of pixels of the ROI 310. Similarly, image data 330 may be read from the image sensor 130 column by column, either from left to right (in which case the autofocus lens movement region 320 is to the right of the ROI 310) or from right to left (in which case the autofocus lens movement region 320 is to the left of the ROI 310). Based on whether columns are read from the top down or from the bottom up, the autofocus lens movement region 320 may include a small area below or above the last-read column of pixels of the ROI 310, respectively.

Furthermore, in some cases, the image data 330 may be read from the image sensor 130 starting from a row other than the top row of the image frame 300 or the bottom row of the image frame 300. For instance, the image data 330 may be read from the image sensor 130 starting from a top row of the ROI 310 or a bottom row of the ROI 310. Similarly, if the image data 330 is read column by column, then the image data 330 may be read from the image sensor 130 starting from a column other than the leftmost column of the image frame 300 or the rightmost column of the image frame 300. For instance, the image data 330 may be read from the image sensor 130 starting from a leftmost column of the ROI 310 or a rightmost column of the ROI 310. Once the image data 330 corresponding to the ROI 310 is read, the rest of the image frame 300 may be read. In this way, the ROI 310 may be read as soon as possible to enable the lens to start moving again as soon as possible.

Figure 4:
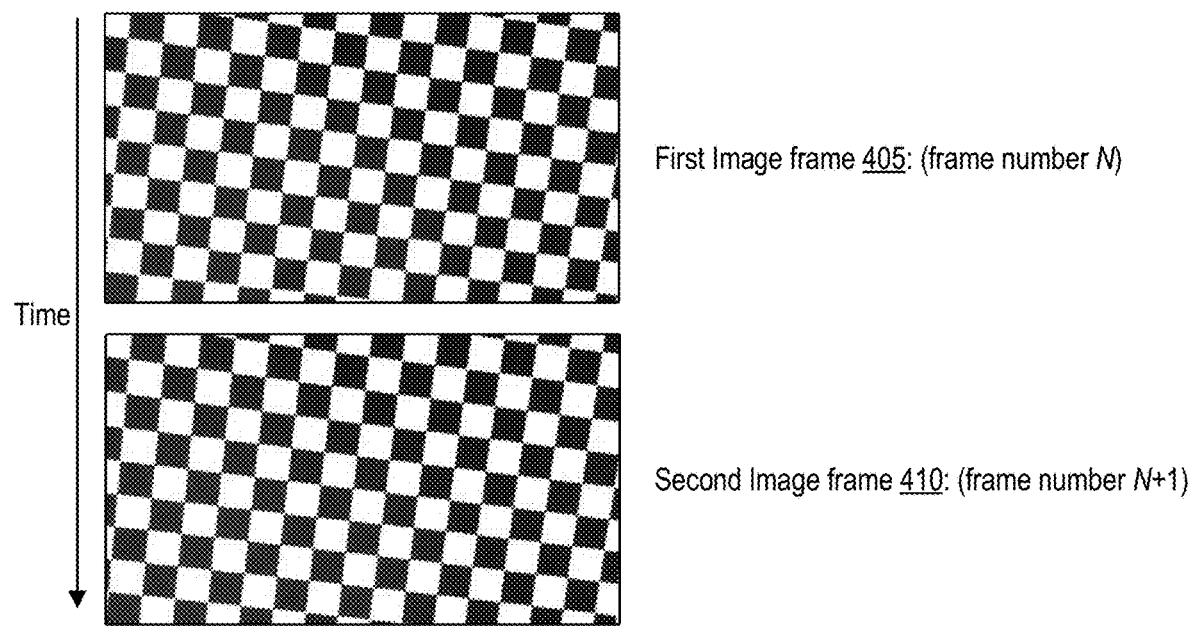
FIG. 4 is a conceptual diagram illustrating two consecutive image frames that depict the same scene, but have visual differences that are caused by a lens movement and that are identified through a vector field that identifies movement of features in the scene between the image frames.
Figure 4:
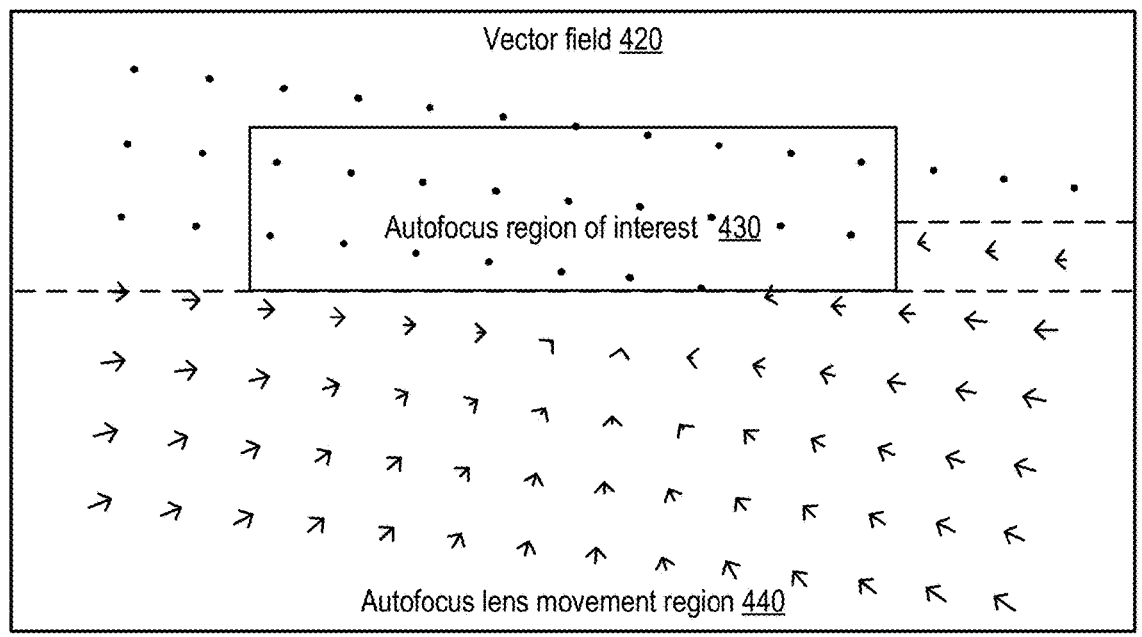

FIG. 4 is a conceptual diagram illustrating two consecutive image frames (405, 410) that depict the same scene, but have visual differences that are caused by a lens movement and that are identified through a vector field 420 that identifies movement of features in the scene between the image frames. The two image frames include a first image frame 405 with a frame number of N, and a second image frame 410 with a frame number of N+1. That is, the second image frame 410 (N+1) is the next image frame consecutively after the first image frame 405 (N). Both the first image frame 405 and the second image frame 410 depict a checkerboard scene, but there are subtle visual differences between the first image frame 405 and the second image frame 410. These visual differences are particularly noticeable toward the bottom of the image frames, and are caused by lens movement that occurred during readout of image frame 410 from the image sensor 130. The lens movement may be, for example, a lens movement that moves the lens closer to the image sensor 130, reducing the focal length and therefore increasing FOV (e.g., a movement from a near lens position 220 to a far lens position 230).

The vector field 420 tracks changes to positions of a number of features from the first image frame 405 to the second image frame 410, namely the positions of checker intersection points at the intersections of the checkers in the checkerboard pattern. The checker intersection points that do not change location between the first image frame 405 and the second image frame 410 are illustrated in the vector field 420 as points. The checker intersection points that do change location from the first image frame 405 and the second image frame 410 are illustrated in the vector field 420 as vectors. The direction that the vectors point indicate the direction in which the corresponding checker intersection points moved from the first image frame 405 to the second image frame 410. The length of the vectors indicates the distance that the corresponding checker intersection points moved from the first image frame 405 to the second image frame 410.

An autofocus region of interest (ROI) 430 and an autofocus lens movement region 440 are illustrated on the vector field 420. The vector field only includes points within the ROI 430, above the ROI 430, and to the left of the ROI 430. Thus, in these areas, the checker intersection points remain stationary from the first image frame 405 to the second image frame 410. The vector field only includes arrows below the ROI 430 in the autofocus lens movement region 440. These arrows point inward toward the ROI 430, meaning that the checker intersection points move inward toward the ROI 430 from the first image frame 405 to the second image frame 410 as the field of view expands to include more image data that was not in the first image frame 405. The vector field also includes some arrows to the right of a bottom row of the ROI 430. These arrows also point inward toward the ROI 430, because the corresponding checker intersection points to the right of the autofocus region of interest 430 also move inward from the first image frame 405 to the second image frame 410. This region to the right of the ROI 430 may also be part of the autofocus lens movement region 440, as discussed with respect to FIG. 3, and as indicated by the second dashed line extending from the right of the ROI 430 of FIG. 4.

The movement inward and expansion of the field of view indicated in the vector field 420 is noticeable in portions of the second image frame 410. For instance, in the bottom-left corner of the second image frame 410, a portion of a white checker is clearly visible that is not clearly visible in the first image frame 405. Similarly, a small portion of a white checker is visible below the fourth black checker from the right along the bottom edge of the second image frame 410, while the same white checker is not visible at all in the first image frame 405. Thus, the checker intersection points in the autofocus lens movement region 440 that are visible in both the first image frame 405 and the second image frame 410 move inward to make room for additional image data added in at the periphery of the second image frame 410 that was not present in the first image frame 405. This additional image data is added into the second image frame 410 due to FOV expansion.

FIG. 5A is a conceptual diagram illustrating operations 500 for horizontal field of view compensation for a particular row of pixels 515 in an image frame 505. One way to compensate for changes to field of view such as those illustrated in FIG. 4 is to perform field of view compensation on a row-by-row basis using the operations 500 of FIG. 5A. The operations 500 of FIG. 5A may be used to modify an image frame 505 having an expanded field of view within an autofocus lens movement region 510 into a modified image frame 505 having a corrected field of view in the autofocus lens movement region 510.

In particular, the image processing device 105B selects a row of pixels 515 from the autofocus lens movement region 510. The row of pixels 515 is cropped in a crop operation 520 to remove, from the row of pixels 515, portions of image data from the expanded FOV 525 (shaded in FIG. 5A) that add in new image data that is not present in previous image frames and that correspond to an expansion in FOV. The crop operation 520 may determine the areas to crop based on a crop ratio. The crop ratio may be determined based on detected changes to the position of a lens, interpolated changes to the position of the lens, observed image differences in the row of pixels 515 compared to the same row of pixels in a prior image frame corresponding to an expansion in field of view, interpolation of image differences in the row of pixels 515 based on image differences in one or more other rows of the image frame 505, interpolation of the crop ratio based on one or more other crop ratios determined for the image frame 505, or some combination thereof. The prior image frame may be an image frame immediately preceding the image frame 505, or may be another prior image frame (e.g., more than one frame prior to the image frame 505).

Once the row of pixels 515 is cropped using the crop operation 520, the cropped row of pixels is expanded out to the width of the original row of pixels 515 through an expand operation 530, which may be referred to as a resizing operation. The expand operation 530 may use an upscaling technique, such as nearest neighbor interpolation, bilinear interpolation, bicubic interpolation, another upscaling technique, another resizing technique, or some combination thereof. Bilinear interpolation is sometimes referred to as bilinear filtering. Bicubic interpolation is sometimes referred to as bicubic filtering. Once the cropped row of pixels is expanded using the expand operation 530, the cropped and expanded row of pixels is inserted into a modified image frame 550 at the same row number as the original row number of the row of pixels 515 in the original image frame 505. The operation 500 may be performed for every row of pixels 515 in the autofocus lens movement region 510. In some cases, the operation 500 is performed for every row of pixels 515 in the autofocus lens movement region 510 consecutively starting from the top row of the autofocus lens movement region 510 and going down, row by row, until the operation 500 is performed for the bottom row of the autofocus lens movement region 510. In some cases, another order may be used, such as the operation 500 being performed for the starting from the bottom row and going up, row by row, until the operation 500 is performed for the top row of the autofocus lens movement region 510.

In some cases, the expand operation 530 may use pixel data from neighboring rows of pixels in addition to the pixel data from the current row 515 to enhance upscaling. The neighboring rows of pixels may include rows of pixels that are not and/or do not need to be modified because they are not in the autofocus lens movement region 510. The neighboring rows of pixels may also include rows of pixels that have already been modified using the field of view compensation operations 500. Use of pixel data from neighboring rows in addition to the pixel data from the current row 515 may enhance quality upscaling when a form of upscaling is used that works best when two dimensions of image data are present. For instance, if the row of pixels 515 selected in the operation 500 is the top row of pixels in the autofocus lens movement region 510, additional image data from the row above the row of pixels 515 may be appended atop the cropped variant of the row of pixels 515 before the expand operation 530. This additional image data may then be cropped out before the expanded row of pixels is inserted into the modified image frame 550. If the row of pixels 515 selected in the operation 500 is the next row of pixels below the top row of pixels in the autofocus lens movement region 510, the additional image data may be taken from the top row of pixels in the autofocus lens movement region 510 in the modified image frame 550. The process may continue this way until all rows of pixels in the autofocus lens movement region 510 are modified.

Thus, where the autofocus lens movement region 510 of an image frame 505 includes multiple rows, different subsets of those rows are cropped (during the crop operation 520) according to different crop ratios depending on the change in the field of view. As such, one row may be cropped from the original row length to a first cropped row length according to a first crop ratio, while another row may be cropped from the original row length to a second cropped row length distinct from the first crop row length according to a second crop ratio distinct from the first crop ratio. A crop ratio associated with a certain change in FOV may be referred to as an FOV crop ratio. Where different rows are associated with different changes in FOV, different rows may have different FOV crop ratios. Each crop ratio may identify a number of pixels of a row to crop off of either or both sides of the row. Each crop ratio may identify a number of pixels of a row to keep, while cropping out the remaining pixels of the row. Each crop ratio may identify a percentage or ratio of the pixels of a row to be cropped off of either or both sides of the row. Each crop ratio may identify a percentage or ratio of the pixels of a row to keep, while cropping out the remaining pixels of the row. In some cases, a crop ratio may identify more than one of the above types of data.

Similarly, where the autofocus lens movement region 510 of an image frame 505 includes multiple rows, different subsets of those rows are expanded or otherwise resized (during the expand operation 530) by different resize amounts. The rows may be resized after cropping as illustrated in FIG. 5A, so that the cropped row is expanded to fit the original width (in pixels) of the image frame 505. The rows may alternately be resized before cropping, in which case a resizing ratio can be determined based on the FOV crop ratio for a row so that cropping the resized row brings the length of the resized row back to the length of the original row. In some cases, the crop ratio for the row may be altered if resizing occurs before cropping, so that more pixels are cropped during the cropping operation 520. Resizing before cropping may allow the resizing operation to take advantage of interpolation based on more image data, since all of the pixels of the row are still present during resizing. On the other hand, resizing after cropping may be faster and more efficient. Where a resizing ratio is determined for each of the different rows of the autofocus lens movement region 510, different subsets of those rows may have different resizing ratios, because those different subsets have different FOVs and different FOV cropping ratios.

FIG. 5B is a conceptual diagram illustrating operations for vertical field of view compensation for an autofocus lens movement region 510 in an image frame 565. The image frame 565 of FIG. 5B may be the image frame 505 of FIG. 5A or the modified image frame 550 of FIG. 5A. In some cases, expansion of the field of view in the autofocus lens movement region 510 may also include more image data vertically, not just horizontally. For example, the bottom row of pixels, or bottom M rows of pixels in the autofocus lens movement region 510 of an image frame 565 may include a portion of image data corresponding to an expanded FOV 568 that depicts a portion of the scene that was not depicted in prior image frames and that corresponds to the FOV expansion. In such cases, the portion of image data corresponding to the expanded FOV 568 (e.g., the bottom row of pixels or bottom M rows of pixels) in the autofocus lens movement region 510 may be cropped out of the autofocus lens movement region 510 using a crop operation 570. The portion of the autofocus lens movement region 510 that is cropped out using the crop operation 570 may be determined based on a crop ratio. The crop ratio may be determined based on detected changes to the position of a lens, interpolated changes to the position of the lens, observed image differences in the autofocus lens movement region 510 compared to the autofocus lens movement region 510 in a prior image frame corresponding to an expansion in field of view, interpolation of the crop ratio based on one or more crop ratios determined for the crop operation 520 of the operations 500, interpolation of the crop ratio based on a prior crop ratio associated with one or more prior image frames, or some combination thereof. The cropped variant of the autofocus lens movement region 510 may be expanded using an expand operation 575 to the original size of the autofocus lens movement region 510 using any of the upscaling techniques discussed above with respect to the expand operation 530 of FIG. 5A. This cropped and expanded variant of the autofocus lens movement region 510 may replace the autofocus lens movement region 510 of the image frame 565 in a modified image frame 580. This vertical field of view compensation operation may be performed before or after the horizontal field of view compensation operations 500 performed on the rows of pixels.

In some cases, an autofocus lens movement region 510 may be at the top of an image frame 565 rather than the bottom of the image frame 565, for example when a lens movement begins in a previous image frame and continues into the image frame 565. In this case, the same operations 560 may be performed, but with the top row of pixels (or top M rows of pixels) of the autofocus lens movement region 510 having the portions of image data from the expanded FOV 568 that are cropped out during the cropping operation 570.

In some cases, an image frame 565 may entirely be an autofocus lens movement region 510, for example when a lens movement that began at a previous frame continues into the image frame 565 and into the next image frame after the image frame 565. In this case, the same operations 560 may be performed by cropping both a top row of pixels (or top $M_1$ rows of pixels) and a bottom row of pixels (or bottom $M_2$ rows of pixels) out during the cropping operation 570. The expansion operation 575 may be performed once, after both of the cropping operations 570 are complete. The expansion operation 575 may alternately be performed twice, once after each of the two cropping operations 570 are complete.

Figure 6A:
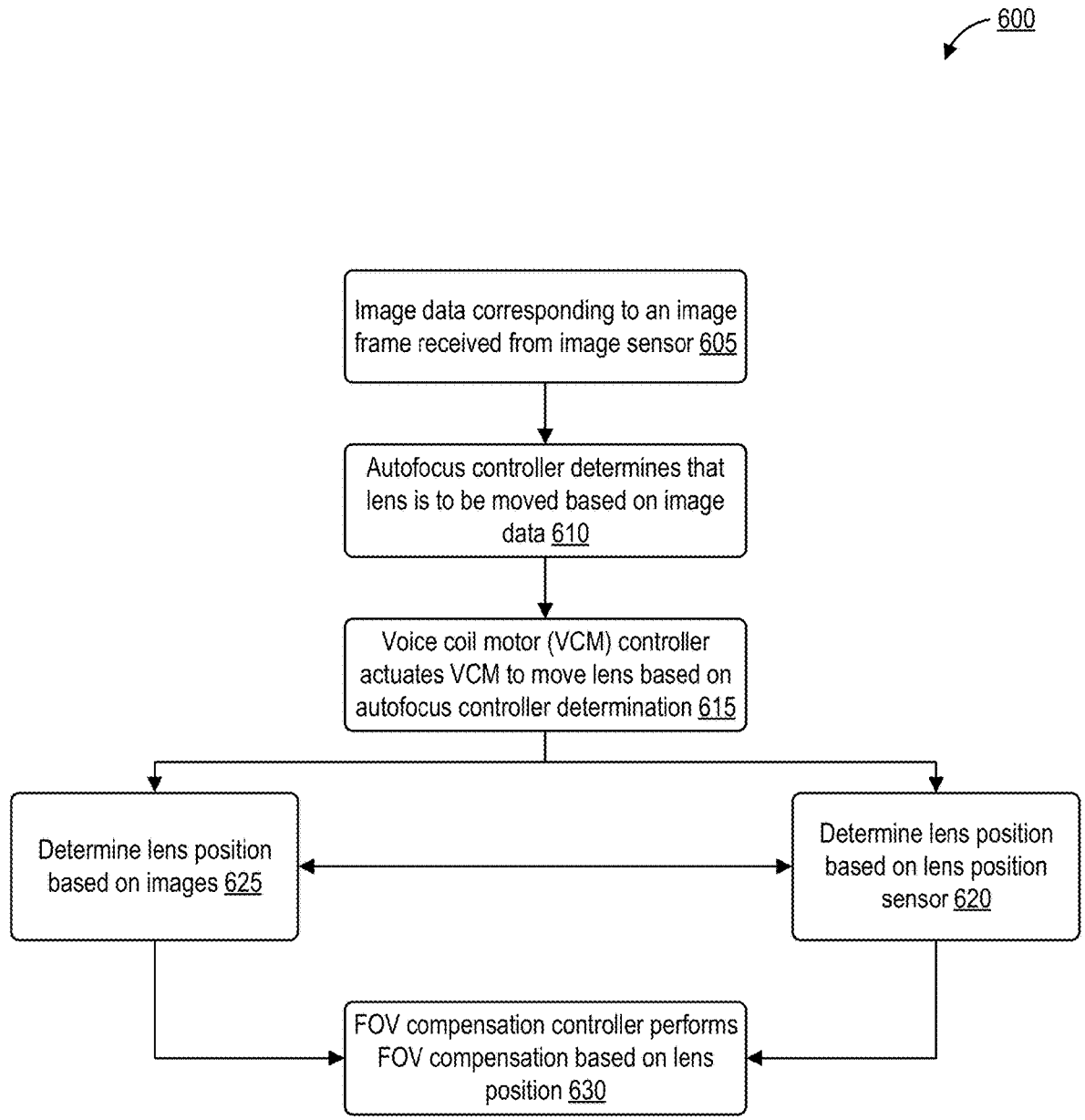
FIG. 6A is a flow diagram illustrating operations for field of view compensation based on an autofocus-driven lens movement and lens position detection using a lens position sensor.

FIG. 6A is a flow diagram illustrating operations 600 for field of view compensation based on an autofocus-driven lens movement in an image capture device 105A with a lens position sensor. The operations 600 of FIG. 6A describe actions performed by a device and/or by components of the device. The device performing the operations 600 may be, or may include, an image capture device 105A, an image processing device 105B, an image capture and processing device 100, a computing device 1000, or some combination thereof.

At operation 605, the device receives image data corresponding to an image frame from an image sensor 130 of the image capture device 105A. At operation 610, an autofocus controller of the device determines that a lens of the image capture device 105A is to be moved as part of an autofocus process based on the image data received during operation 605. The autofocus controller may determine this based on a focus indicator determined using data from photodiodes of the image sensor 130 that correspond to an autofocus region of interest 310/430. For instance, the focus indicator may be a focus value determined based on a contrast between a subject and a background (for CDAF), or may be a phase difference between phases of light detected by one or more phase detection (PD) photodiodes (for PDAF).

At operation 615, a voice coil motor (VCM) controller actuates a VCM of the image capture device 105A to move the lens based on the autofocus controller's determination at operation 610. The VCM controller may actuate the VCM and move the lens while some of the image data is still being received at operation 605. The VCM may be an open-loop VCM or a closed-loop VCM. In some cases, an alternate type of motor or other lens mechanism may be used in place of a VCM.

After performing operation 615, the device may perform operation 620, operation 625, or both operation 620 and operation 625. As noted above, the device performing the operations 600 of FIG. 6A includes a lens position sensor. At operation 620 the device determines one or more lens positions of the lens based on lens position sensor information received from the lens position sensor via one or more lens position sensor signals. For example, the lens position sensor may detect a start position of the lens at the start of a particular lens movement (or before the lens movement begins) and an end position of the lens at the end of the lens movement (or after the lens movement ends). The lens position sensor may convey these two lens positions via the lens position sensor information transferred over the one or more lens position sensor signals. In some cases, a first set of one or more lens position sensor signals from the lens position sensor may convey the start position of the lens, and a separate set of one or more lens position sensor signals from the lens position sensor may convey the end position of the lens. In some cases, the lens position sensor may detect the position of the lens at one or more lens positions within a range of positions in between the start position of the lens movement and the end position of the lens movement. This range of positions may include the start position and/or the end position of the lens, or may exclude start position and/or the end position of the lens. In some cases, a timestamp identifying when the lens is at the start position may be determined based on when lens position sensor information corresponding to the start of lens movement is measured by and/or received from the lens position sensor. A timestamp for when the lens is at the end position may be determined based on when lens position sensor information corresponding to the end of lens movement is measured by and/or received from the lens position sensor.

At operation 625, the device determines one or more lens positions of the lens based on the image data received at operation 605, and in some cases also based on additional image data corresponding to one or more image frames captured by the image sensor 130 before capture of the image frame to which the image data of operation 605 corresponds to. The image frame of operation 605 and the one or more image frames of the additional image data may be a consecutive sequence of image frames. For instance, the image processing device 105B may use vector fields 420 (as in FIG. 4) and/or image differences (as in FIG. 7) to determine at which image frame(s) a lens movement begins and ends. The image processing device 105B may use this determination of when the lens movement begins and ends to determine how much the FOV expanded from image frame(s) captured before the lens movement to image frame(s) captured during and/or after the lens movement.

The lens positions may be determined during operation 625 by first determining a lens movement duration, and multiplying the lens movement duration by a known lens movement speed (which may be relatively constant and based on the motor specification) to identify a lens movement distance. The lens movement duration may, in some cases, be determined using the following equation:

$$\text{lens\_movement\_duration} = \left(\frac{\text{number\_of\_rows\_with\_image\_difference}}{\text{image\_height}}\right) \cdot \text{exposure\_time}$$

In this equation, lens_movement_duration is the lens movement duration, number_of_rows_with_image_difference is a number of rows of pixels across one or more image frames in which an image difference is observed over the duration of the lens movement, image_height is the height of the image frame in pixels, and exposure_time is the exposure time in milliseconds (ms) as set in an exposure time setting of the image capture device 105A. For example, a set of three consecutive image frames can be used, each with a height of 1080 pixels. An image difference between the first image frame and the second image frame shows an image difference in the bottom 380 rows. An image difference between the second image frame and the third image frame shows an image difference in the top 240 rows. The exposure time in this example is 33 ms. Thus, in this example, the lens movement duration is 18.94 ms:

$$\text{lens\_movement\_duration} = \left(\frac{380 + 240}{1080}\right) \cdot (33 \text{ ms}) = 18.94 \text{ ms}.$$

Once the device determines lens positions using operation 620, operation 625, or some combination thereof, operation 630 follows. At operation 630, a FOV compensation controller of the device performs FOV compensation based on the lens positions. Because the size of the FOV is inversely proportional to the focal length, the change in lens position can be used to determine the expansion of the FOV, for instance based on optical flow. The expansion in FOV may be used by the device to determine the crop ratio(s) and/or resizing ratio(s) used in the cropping operation 520, the expansion operation 530, the cropping operation 570, and the expansion operation 575 of FIG. 5A and FIG. 5B. Alternately, the FOV compensation controller of the device may perform FOV compensation (and determine crop ratio(s) and/or resizing ratio(s)) based directly on a lens movement duration and/or distance as determined at operation 620 and/or at operation 625, since lens movement duration is proportional to change in lens position. FOV compensation may include the cropping operation 520, the expansion operation 530, the cropping operation 570, and the expansion operation 575 of FIG. 5A and FIG. 5B.

The lens position determination based on the images of operation 625 may be performed instead of or in addition to the lens position determination based on the lens position sensor measurement of operation 620. One or both of the lens position determined through operation 620 and the lens position determined through operation 625 can be used for the FOV compensation of operation 630 (e.g., for determine crop ratio(s) and/or resizing ratio(s) for FOV compensation). For instance, if the determines a lens position through either one of operation 620 and operation 625 more quickly than through the other, the earliest of the two determinations of lens position may be used for the FOV compensation of operation 630. In some cases, the device may calculate an average lens position by taking an average of a lens position that the device determines through operation 620 and a lens position that the device determines through operation 625. This average lens position may in some cases be a more accurate lens position determination than a lens position determined using only one of the two operations 620 and 625.

Figure 6B:
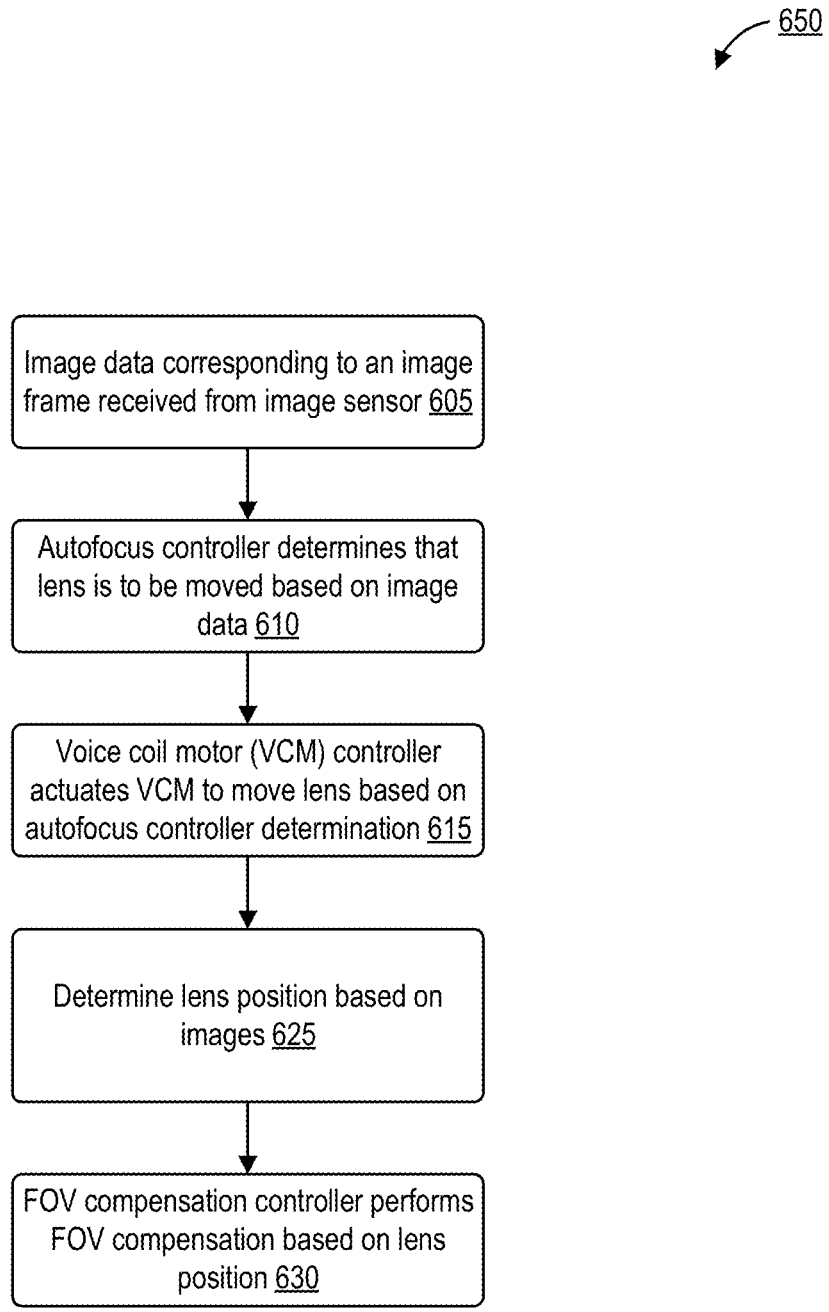
FIG. 6B is a flow diagram illustrating operations for field of view compensation based on an autofocus-driven lens movement and lens position detection based on image differences.

FIG. 6B is a flow diagram illustrating operations 650 for field of view compensation based on an autofocus-driven lens movement in an image capture device 105A without a lens position sensor. The operations 650 of FIG. 6B describe actions performed by a device and/or by components of the device. The device performing the operations 650 may be, or may include, an image capture device 105A, an image processing device 105B, an image capture and processing device 100, a computing device 1000, or some combination thereof.

The operations 650 of FIG. 6B include some of the same operations performed in the operations 600 of FIG. 6A. In particular, the operations 600 include the operation 605, the operation 610, the operation 615, the operation 625, and the operation 630. The operations 650 of FIG. 6B are missing operation 620 in which a lens position sensor is used to determine lens position because the operations 650 are performed by a device without a lens position sensor. Thus, in the operations 650, the lens position is determined using operation 625.

Figure 7:
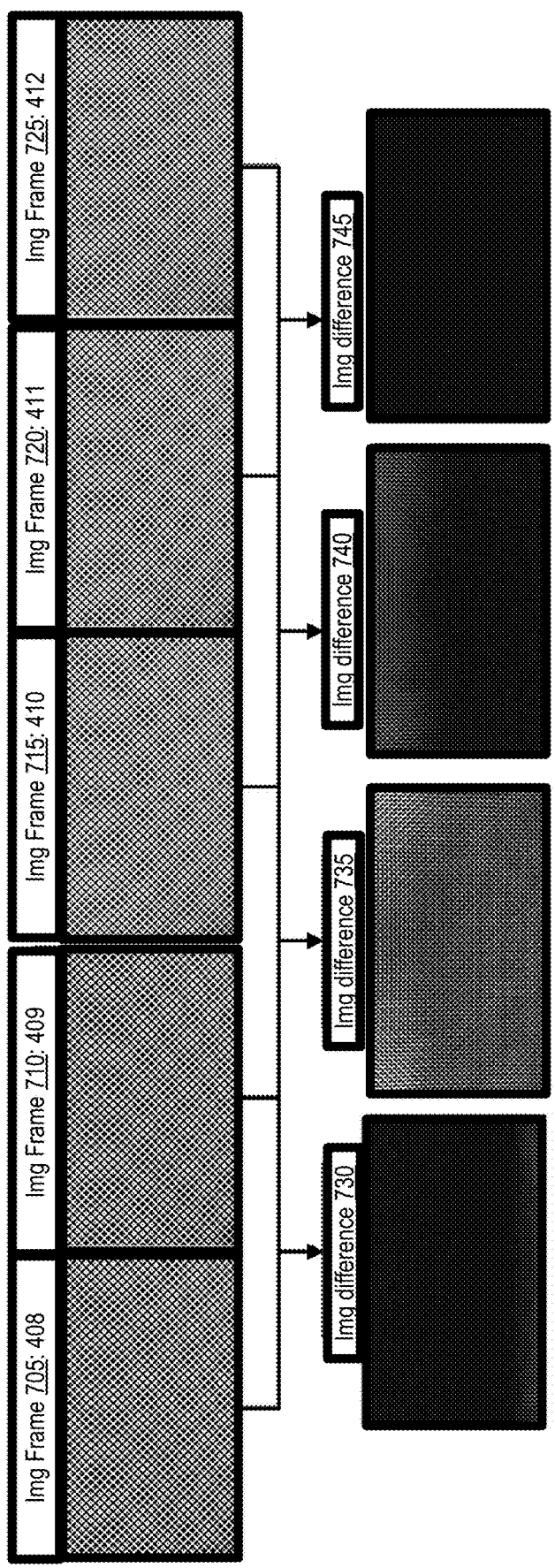
FIG. 7 is a conceptual diagram illustrating five consecutive image frames that depict the same scene but have visual differences that are caused by a lens movement and that are identified through image differences between the image frames.

FIG. 7 is a conceptual diagram illustrating five consecutive image frames 705-725 that depict the same scene but have visual differences that are caused by a lens movement and that are identified through image differences between the image frames. The five consecutive image frames 705-725 all depict a checkerboard scene, with some minor differences in certain frames due to changes in FOV caused by a lens movement during capture of the image frames. The five image frames 705-725 may be image frames that are part of a video. The first image frame 705 is the 408$^{th}$ frame in the video, the second image frame 710 is the 409$^{th}$ frame in the video, the third image frame 715 is the 410$^{th}$ frame in the video, the fourth image frame 720 is the 411$^{th}$ frame in the video, and the fifth image frame 725 is the 412$^{th}$ frame in the video.

Four image differences 730, 735, 740, and 745 are illustrated in FIG. 7. Each of the image differences compares two of the image frames 705-725. Each of the image differences is black where no differences are present between the two frames being compared, and is white or grey where differences are present between the two frames being compared. A first image difference 730 showing comparing the first image frame 705 and the second image frame 710 is mostly black, with some white lines visible in a region at the bottom of the first image difference 730. This region at the bottom of the first image difference 730 with the white lines visible indicates detected visual differences between the first image frame 705 and the second image frame 710 resulting from the lens having begun moving while that bottom region of the second image frame 710 was being read from the image sensor. The region at the bottom of the first image difference 730 with white lines visible may be considered an autofocus lens movement region 320/440/510 of the second image frame 710.

A second image difference 735 comparing the second image frame 710 and the third image frame 715 includes many white lines throughout the entire second image difference 735, indicating detected visual differences between the second image frame 710 and the third image frame 715 spanning the entire height of both frames. These differences between the second image frame 710 and the third image frame 715 indicate lens movement occurring during readout of the entirety of the third image frame 715 from the image sensor. The entirety of the third image frame 715 may be considered an autofocus lens movement region 320/440/510.

A third image difference 740 comparing the third image frame 715 and the fourth image frame 720 is mostly black, but includes a region with some white lines at the top of the third image difference 740. This region at the top of the third image difference 740 with white lines visible indicates detected visual differences between the third image frame 715 and the fourth image frame 720 resulting from the lens still moving during readout from the image sensor of the region at the top of the fourth image frame 720. The lens stopped moving during readout from the image sensor of the fourth image frame 720 after readout from the image sensor of the region at the top of the fourth image frame 720. The region at the top of the third image difference 740 with white lines visible may be considered an autofocus lens movement region 320/440/510 of the fourth image frame 720. A fourth image difference 745 comparing the fourth image frame 720 and the fifth image frame 725 is entirely black, indicating that there are no detected visual differences between fourth image frame 720 and the fifth image frame 725. Thus, the lens did not move during readout of the fifth image frame 725.

A timestamp for when the lens is at a start movement position may be determined based on when rows of the image sensor are read out that correspond to an image difference transitioning from black (representing no FOV change due to lens movement) to having white lines (representing FOV change due to lens movement). A timestamp for when the lens is at the end movement position may be determined based on when rows of the image sensor are read out that correspond to an image difference transitioning from black (representing no FOV change due to lens movement) to having white lines (representing FOV change due to lens movement).

The image differences 730-745 may be performed through image subtraction, pixel subtraction, image division, pixel division, another image difference method, a Hutchinson metric, or some combination thereof.

Figure 8:
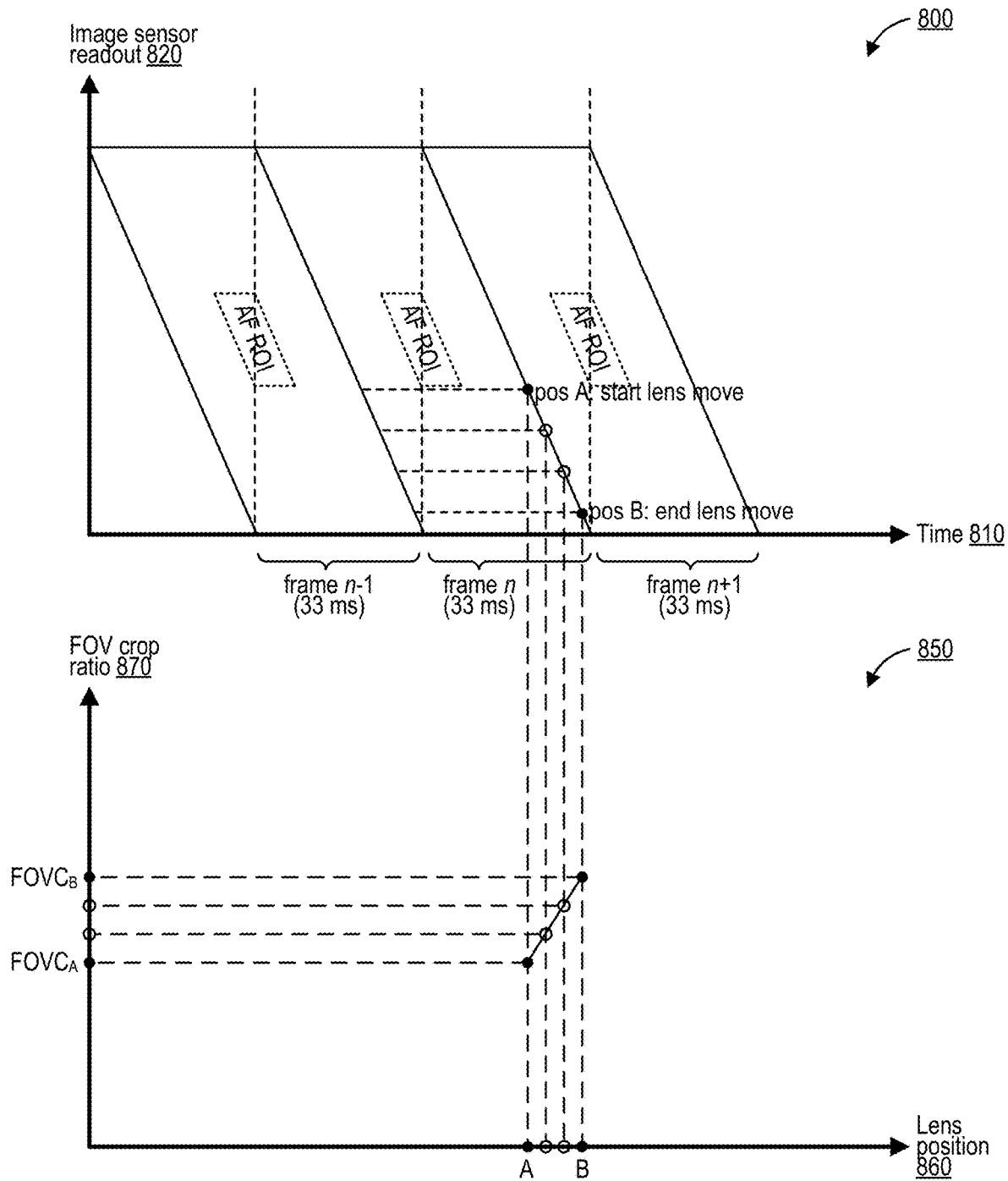
FIG. 8 is a conceptual diagram illustrating two graphs of consecutive image frame readout, lens movement, and lens position interpolation.

FIG. 8 is a conceptual diagram illustrating two graphs (800, 850) of consecutive image frame readout, lens movement, and lens position interpolation. The top graph 800 illustrates image sensor readout 820 of three consecutive image frames (first image frame n−1, second image frame n, and third image frame n+1) as a function of time 810. Each of the three image frames appear slanted diagonally to indicate time required to read each row of the image sensor 130 to capture that image frame. Within the second image frame n, four points are identified as points along a right-hand side of the second image frame n. Position A represents a start of lens movement (a "start position"), and a position B represents an end of lens movement (an "end position"). Positions A and B are marked with black circles along the right-hand side of the second image frame n, with dashed lines extending horizontally from positions A and B across the second image frame n. Two additional points during lens movement are added at equal intervals between positions A and B, and are marked with white circles along the right-hand side of the second image frame n, also with dashed lines extending horizontally across the second image frame n. These two additional points correspond to interpolated lens positions. The lens movement may be, for example, a lens movement that reduces focal length and therefore increases FOV (e.g., a movement from a near lens position 220 to a far lens position 230).

Vertical dashed lines extend down from the two black circles representing lens position A and lens position B into the bottom graph 850. Vertical dashed lines also extend down from the two white circles representing the two interpolated lens positions between lens positions A and B into the bottom graph 850. The horizontal axis of the bottom graph 850 represents lens position 860, while the vertical axis of the bottom graph 850 represents FOV crop ratio 870. A direct linear relationship is revealed between lens position 860 and FOV crop ratio 870, with a FOV crop ratio $FOVC_B$ at position B exceeding a FOV crop ratio $FOVC_A$ at position A. Additional FOV crop ratios in between $FOVC_A$ and $FOVC_B$ are interpolated for each of the interpolated lens locations. By using this type of lens position and FOV crop ratio interpolation, FOV crop ratios can be determined separately for different rows of an image, or different groups of rows in an image frame, as needed.

In some cases, lens position sensors (such as those used in operation 620 of the process 600) may not be able to detect lens positions often or quickly enough to determine lens positions when image sensor readout is at a particular row. Similarly, image-based lens position determination as in operation 625 may not be precise enough to determine lens positions when the image sensor readout is at a particular row. Regardless of which type of lens position determination is used, the lens position interpolation and FOV crop ratio interpolation techniques illustrated in FIG. 8 effectively increase the resolution of lens position information and corresponding FOV crop ratio at any given time. By applying this interpolated lens position information and corresponding FOV crop ratio information during FOV compensation operations 500 and/or 560 of FIGS. 5A and/or 5B, differences between images can be minimized despite lens movements and corresponding changes in FOV. Vector fields showing differences for two image frames in which FOV compensation is applied using interpolated lens position information and corresponding FOV crop ratio information show every point either remaining still or remaining within a small vector error threshold.

Figure 9:
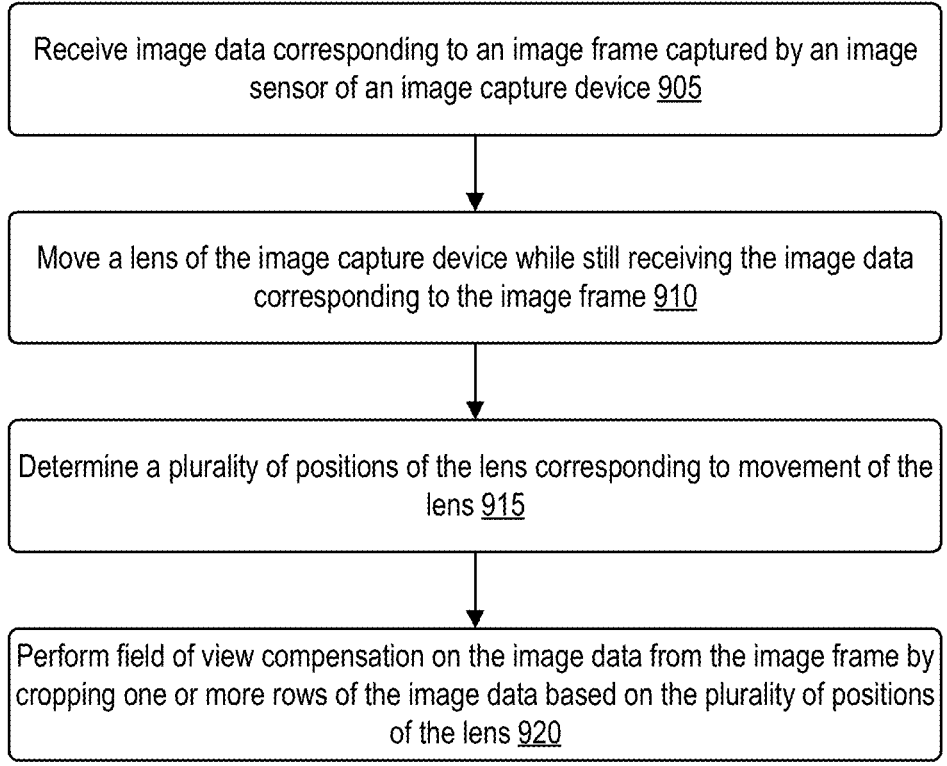
FIG. 9 is a flow diagram illustrating a method of image processing.

FIG. 9 is a flow diagram illustrating a method 900 of image processing. The method 900 of FIG. 9 describes actions performed by a device and/or by components of the device. The device performing the method 900 may be, or may include, an image capture device 105A, an image processing device 105B, an image capture and processing device 100, a computing device 1000, or some combination thereof.

At operation 905, the device receives image data corresponding to an image frame captured by an image sensor 130 of an image capture device 105A. The image data may include at least part of an image frame. For instance, the image data may include one or more pixels of an image frame and/or one or more rows of pixels of the image frame. The device may include an image sensor connector that couples to the image sensor 130 and that receives the image data from the image sensor 130. The device may include the image sensor 130. At operation 910, the device moves a lens of the image capture device 105A while still receiving the image data corresponding to the image frame. A lens mechanism may control the lens, and moire specifically may control positioning and/or movement of the lens. The device may include a lens mechanism connector that couples to the lens mechanism to the device. Moving the lens of the image capture device 105A can include sending a lens mechanism actuation signal from the device to the lens mechanism over the lens mechanism connector. The lens mechanism may include a motor, and the lens mechanism connector may include a motor connector. Actuating the lens mechanism may include actuating the motor that moves the lens by sending a motor actuation signal from the device to the motor over the motor connector. The motor can be a voice coil motor (VCM). The VCM may be an open-loop VCM or a closed-loop VCM.

Moving the lens of the image capture device 105A can include moving the lens toward the image sensor 130 of the image capture device 105A, and therefore farther away from the scene being photographed. Moving the lens of the image capture device 105A can include moving the lens farther away the image sensor 130 of the image capture device 105A, and therefore closer to the scene being photographed. In some cases, moving the lens of the image capture device changes a focus setting from a first focus to a second focus. Moving the lens of the image capture device can be part of an autofocus process. For instance, moving the lens of the image capture device can be part of a PDAF process, a CDAF process, or a hybrid autofocus (HAF) process involving a combination of PDAF and CDAF.

At operation 915, the device determines a plurality of positions of the lens corresponding to movement of the lens. The plurality of positions of the lens may correspond to the movement of the lens performed in operation 910. Moving the lens of the image capture device can include moving the lens of the image capture device 105A from a start position to an end position. The plurality of positions of the lens include the start position and the end position. The plurality of positions of the lens include one or more positions within a range of positions between the start position and the end position. The range of positions may exclude the start position and/or the end position, or may include the start position and/or the end position. The start position may correspond to a first cropping ratio, while the end position may correspond to a second cropping ratio distinct from the first cropping ratio. A third position between the start position and the end position may correspond to a third cropping ratio distinct from the first cropping ratio and the second cropping ratio.

In some cases, the plurality of positions of the lens can include a first position, a second position, and a third position. Determining the second position includes interpolating the second position to be the first position and the third position. Interpolating the second position can be based on the first position, a first timestamp corresponding to the first position, the third position, a third timestamp corresponding to the third position, and a second timestamp corresponding to the second position. The second timestamp is between the first timestamp and the third timestamp.

The device may, in some cases, receive a lens position sensor signal from a lens position sensor included in or coupled to the device. Determining the plurality of positions of the lens can include determining at least a first position of the lens of the plurality of positions of the lens based on the lens position sensor signal. The device may determine a first timestamp corresponding to the first position of the lens based on a time of receipt of the lens position sensor signal from the lens position sensor. Performing the field of view compensation on the image data in operation 920 may be based on the first timestamp. The device may include a lens position sensor connector that couples to the lens position sensor and that receives the lens position sensor signal(s) from the lens position sensor. The device may include the lens position sensor.

In some aspects, the methods, apparatuses, and computer-readable medium described above further comprise: receiving additional image data from one or more additional image frames captured by the image sensor after the image sensor captures the image frame, wherein determining the plurality of positions of the lens includes determining at least one of the plurality of positions of the lens based on an image difference between the image frame and the one or more additional image frames. In some aspects, the methods, apparatuses, and computer-readable medium described above further comprise: determining a duration of lens movement based on a number of rows of pixels for which the image difference indicates a change in field of view, a height of the image frame, an exposure time setting of the image capture device, wherein determining the plurality of positions of the lens is based on the duration of lens movement. In some aspects, the image sensor captures the one or more additional image frames consecutively after capturing the image frame.

At operation 920, the device performs field of view compensation on the image data from the image frame by cropping one or more rows of the image data based on the plurality of positions of the lens. Performing field of view compensation on the image data from the image frame may also include resizing each of the one or more rows of the image data in addition to cropping the one or more rows of the image data. Resizing may include any type of upscaling technique discussed herein. The resizing of a row may occur after cropping of the row. Alternately, the resizing of a row may occur before cropping of the row. Cropping the one or more rows of the image data based on the plurality of positions of the lens can include cropping a first row of the image data to a first size and cropping a second row of the image data to a second size that is distinct from the first size. Similarly, resizing the one or more rows of the image data can include resizing a first row of the image data by a first percentage and resizing a second row of the image data by a second percentage that is distinct from the first percentage.

In some cases, the operations of the method 900 further include interpolating a second cropping ratio corresponding to the second position to be between a first cropping ratio that corresponds to the first position and a third cropping ratio that corresponds to the third position. Cropping the one or more rows of the image data based on the plurality of positions of the lens includes cropping different subsets of the one or more rows using the first cropping ratio, the second cropping ratio, and the third cropping ratio, respectively.

In some examples, the processes described herein (e.g., processes 500, 560, 600, 900, and/or other process described herein) may be performed by a computing device or apparatus. In one example, the processes 500, 560, 600, and/or 900 can be performed by the image capture device 105A of FIG. 1. In another example, the processes 500, 560, 600, and/or 900 can be performed by the image processing device 105B of FIG. 1. The processes 500, 560, 600, and/or 900 can also be performed by the image capture and processing device 100 of FIG. 1. The processes 500, 560, 600, and/or 900 can be performed by a computing device with the computing device architecture 1000 shown in FIG. 10. The computing device can include any suitable device, such as a mobile device (e.g., a mobile phone), a desktop computing device, a tablet computing device, a wearable device (e.g., a VR headset, an AR headset, AR glasses, a network-connected watch or smartwatch, or other wearable device), a server computer, an autonomous vehicle or computing device of an autonomous vehicle, a robotic device, a television, and/or any other computing device with the resource capabilities to perform the processes described herein, including the processes 500, 560, 600, and/or 900. In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, a network interface configured to communicate and/or receive the data, any combination thereof, and/or other component(s). The network interface may be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

The processes 500, 560, 600, and/or 900 are illustrated as logical flow diagrams, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the processes 500, 560, 600, 900, and/or other process described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

The FOV compensation procedures discussed herein improve cameras and other image capture devices 105A specifically, as well as photography technologies more generally. By applying the FOV compensation procedures discussed herein, the effective FOV visible to the user does not change, even when the lens moves during capture of image frames. These FOV compensation procedures effectively eliminate distortion of image frames due to lens movement during readout of only a portion of the image frame. Interpolation as in FIG. 8 further smooths out FOV compensation and removes any jarring "jumps" in FOV compensation that might otherwise be present. These techniques allow focus to be changed during video capture without change in field of view during the video, for instance. These techniques also allow for improvements in speed to autofocus over techniques that might otherwise wait to move the lens until capture/readout of a current image frame is complete, as such waiting is unnecessary.

Figure 10:
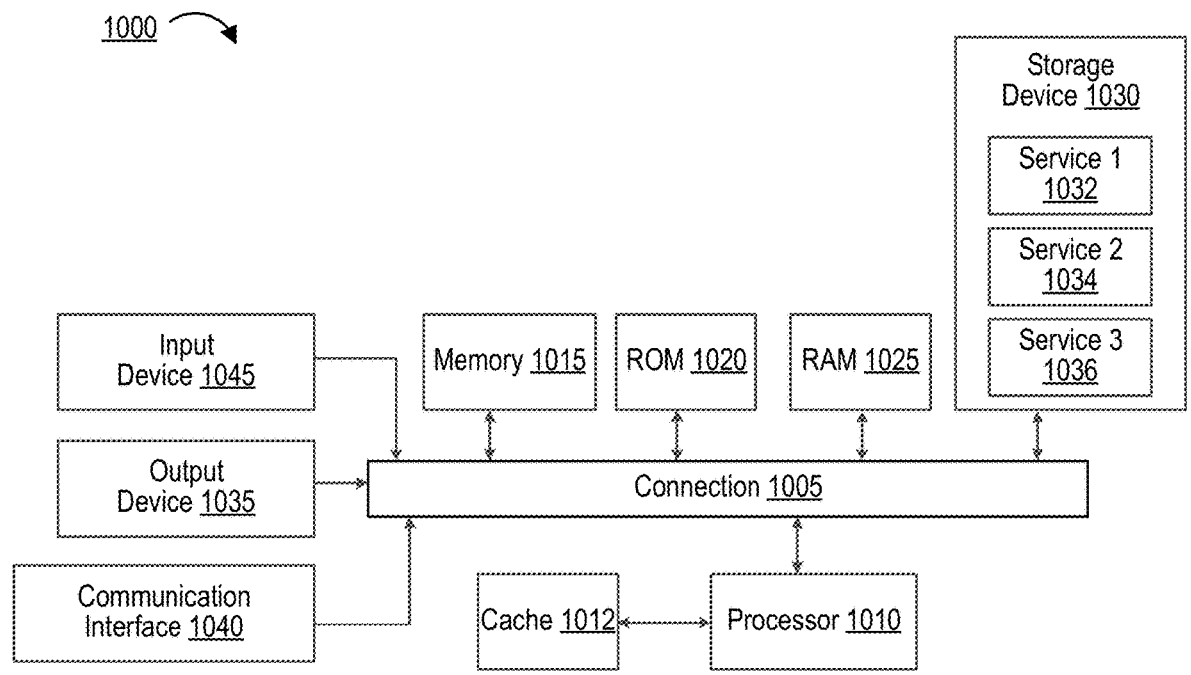
FIG. 10 is a diagram illustrating an example of a system for implementing certain aspects of the present technology.

FIG. 10 is a diagram illustrating an example of a system for implementing certain aspects of the present technology. In particular, FIG. 10 illustrates an example of computing system 1000, which can be for example any computing device making up internal computing system, a remote computing system, a camera, or any component thereof in which the components of the system are in communication with each other using connection 1005. Connection 1005 can be a physical connection using a bus, or a direct connection into processor 1010, such as in a chipset architecture. Connection 1005 can also be a virtual connection, networked connection, or logical connection.

In some embodiments, computing system 1000 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 1000 includes at least one processing unit (CPU or processor) 1010 and connection 1005 that couples various system components including system memory 1015, such as read-only memory (ROM) 1020 and random access memory (RAM) 1025 to processor 1010. Computing system 1000 can include a cache 1012 of high-speed memory connected directly with, in close proximity to, or integrated as part of processor 1010.

Processor 1010 can include any general purpose processor and a hardware service or software service, such as services 1032, 1034, and 1036 stored in storage device 1030, configured to control processor 1010 as well as a special-purpose processor where software instructions are incorporated into the actual processor design. Processor 1010 may essentially be a completely self-contained computing system, containing multiple cores or processors, a bus, memory controller, cache, etc. A multi-core processor may be symmetric or asymmetric.

To enable user interaction, computing system 1000 includes an input device 1045, which can represent any number of input mechanisms, such as a microphone for speech, a touch-sensitive screen for gesture or graphical input, keyboard, mouse, motion input, speech, etc. Computing system 1000 can also include output device 1035, which can be one or more of a number of output mechanisms. In some instances, multimodal systems can enable a user to provide multiple types of input/output to communicate with computing system 1000. Computing system 1000 can include communications interface 1040, which can generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 1040 may also include one or more Global Navigation Satellite System (GNSS) receivers or transceivers that are used to determine a location of the computing system 1000 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1030 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L #), resistive random-access memory (RRAM/ReRAM), phase change memory (PCM), spin transfer torque RAM (STT-RAM), another memory chip or cartridge, and/or a combination thereof.

The storage device 1030 can include software services, servers, services, etc., that when the code that defines such software is executed by the processor 1010, it causes the system to perform a function. In some embodiments, a hardware service that performs a particular function can include the software component stored in a computer-readable medium in connection with the necessary hardware components, such as processor 1010, connection 1005, output device 1035, etc., to carry out the function.

As used herein, the term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" means A, B, or A and B. In another example, claim language reciting "at least one of A, B, and C" means A, B, C, or A and B, or A and C, or B and C, or A and B and C. The language "at least one of" a set and/or "one or more" of a set does not limit the set to the items listed in the set. For example, claim language reciting "at least one of A and B" can mean A, B, or A and B, and can additionally include items not listed in the set of A and B.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

What is claimed is:

1. A method of image processing, the method comprising:
   receiving image data corresponding to an image frame captured by an image sensor of an image capture device;
   moving a lens of the image capture device while still receiving the image data corresponding to the image frame;
   determining a plurality of positions of the lens corresponding to movement of the lens; and
   performing field of view compensation on the image data from the image frame by cropping one or more rows of the image data based on the plurality of positions of the lens.

2. The method of claim 1, wherein moving the lens of the image capture device includes actuating a motor that moves the lens.

3. The method of claim 1, wherein moving the lens of the image capture device includes moving the lens of the image capture device from a start position corresponding to a first cropping ratio to an end position corresponding to a second cropping ratio, wherein the plurality of positions of the lens include the start position and the end position.

4. The method of claim 1, wherein the plurality of positions of the lens include a first position, a second position, and a third position, wherein determining the second position includes interpolating the second position to be between the first position and the third position.

5. The method of claim 4, wherein interpolating the second position based on the first position, a first timestamp corresponding to the first position, the third position, a third timestamp corresponding to the third position, and a second timestamp corresponding to the second position, wherein the second timestamp is between the first timestamp and the third timestamp.

6. The method of claim 4, further comprising:
   interpolating a second cropping ratio corresponding to the second position to be between a first cropping ratio that corresponds to the first position and a third cropping ratio that corresponds to the third position, wherein cropping the one or more rows of the image data based on the plurality of positions of the lens includes cropping different subsets of the one or more rows using the first cropping ratio, the second cropping ratio, and the third cropping ratio, respectively.

7. The method of claim 1, wherein performing field of view compensation on the image data from the image frame includes resizing each of the one or more rows of the image data in addition to cropping the one or more rows of the image data.

8. The method of claim 1, further comprising:
   receiving a lens position sensor signal from a lens position sensor, wherein determining the plurality of positions of the lens includes determining at least a first position of the lens of the plurality of positions of the lens based on the lens position sensor signal.

9. The method of claim 1, further comprising:
   receiving additional image data from one or more additional image frames captured by the image sensor after the image sensor captures the image frame, wherein determining the plurality of positions of the lens includes determining at least one of the plurality of positions of the lens based on an image difference between the image frame and the one or more additional image frames.

10. The method of claim 9, wherein determining the plurality of positions of the lens is based on a duration of movement of the lens, further comprising:
    determining the duration of movement of the lens based on a number of rows of pixels for which the image difference indicates a change in field of view, a height of the image frame, and an exposure time setting of the image capture device.

11. The method of claim 9, wherein the image sensor captures the one or more additional image frames consecutively after capturing the image frame.

12. The method of claim 1, wherein moving the lens of the image capture device includes moving the lens toward the image sensor.

13. The method of claim 1, wherein moving the lens of the image capture device changes a focus setting from a first focus to a second focus.

14. The method of claim 1, wherein moving the lens of the image capture device is part of an autofocus process.

15. The method of claim 1, wherein cropping the one or more rows of the image data based on the plurality of positions of the lens includes cropping a first row of the image data to a first size and cropping a second row of the image data to a second size that is distinct from the first size.

16. An apparatus for image processing, the apparatus comprising:
   an image sensor connector coupled to an image sensor, wherein the image sensor connector receives image data from an image frame captured by the image sensor;
   a lens mechanism connector coupled to a lens mechanism that controls a lens;
   one or more memory units storing instructions; and
   one or more processors that execute the instructions, wherein execution of the instructions by the one or more processors causes the one or more processors to:
      move the lens using the lens mechanism connector while still receiving image data corresponding to the image frame using the image sensor connector,
      determine a plurality of positions of the lens corresponding to movement of the lens, and
      perform field of view compensation on the image data from the image frame by cropping one or more rows of the image data based on the plurality of positions of the lens.

17. The apparatus of claim 16, wherein the apparatus is a mobile device.

18. The apparatus of claim 16, wherein the apparatus includes a display configured to display the image frame.

19. The apparatus of claim 16, further comprising:
   the image sensor; and
   the lens.

20. The apparatus of claim 16, wherein the apparatus is a wireless communication device.

21. The apparatus of claim 16, wherein the lens mechanism is a motor, wherein moving the lens includes actuating the motor to move the lens by sending a motor actuation signal over the lens mechanism connector.

22. The apparatus of claim 16, wherein moving the lens includes moving the lens from a start position corresponding to a first cropping ratio to an end position corresponding to a second cropping ratio, wherein the plurality of positions of the lens include the start position and the end position.

23. The apparatus of claim 16, wherein the plurality of positions of the lens include a first position, a second position, and a third position, wherein determining the second position includes interpolating the second position to be between the first position and the third position.

24. The apparatus of claim 23, wherein interpolating the second position based on the first position, a first timestamp corresponding to the first position, the third position, a third timestamp corresponding to the third position, and a second timestamp corresponding to the second position, wherein the second timestamp is between the first timestamp and the third timestamp.

25. The apparatus of claim 23, wherein execution of the instructions by the one or more processors causes the one or more processors to further:
   interpolate a second cropping ratio corresponding to the second position to be between a first cropping ratio that corresponds to the first position and a third cropping ratio that corresponds to the third position, wherein cropping the one or more rows of the image data based on the plurality of positions of the lens includes cropping different subsets of the one or more rows using the first cropping ratio, the second cropping ratio, and the third cropping ratio, respectively.

26. The apparatus of claim 16, wherein performing field of view compensation on the image data from the image frame includes resizing each of the one or more rows of the image data in addition to cropping the one or more rows of the image data.

27. The apparatus of claim 16, further comprising:
   a lens position sensor connector coupled to a lens position sensor, wherein the lens position sensor connector receives a lens position sensor signal from a lens position sensor, wherein determining the plurality of positions of the lens includes determining at least a first position of the lens of the plurality of positions of the lens based on the lens position sensor signal.

28. The apparatus of claim 16, wherein the image sensor connector receives additional image data from the image sensor, the additional image data being from one or more additional image frames captured by the image sensor after the image sensor captures the image frame, wherein determining the plurality of positions of the lens includes determining at least one of the plurality of positions of the lens based on an image difference between the image frame and the one or more additional image frames.

29. The apparatus of claim 16, wherein moving the lens is part of an autofocus process.

30. A non-transitory computer-readable medium is provided that has stored thereon instructions that, when executed by one or more processors, cause the one or more processors to:
   receive image data corresponding to an image frame captured by an image sensor of an image capture device;
   move a lens of the image capture device while still receiving the image data corresponding to the image frame;
   determine a plurality of positions of the lens corresponding to movement of the lens; and
   perform field of view compensation on the image data from the image frame by cropping one or more rows of the image data based on the plurality of positions of the lens.

* * * * *